United States Patent [19]

Maresca

[11] Patent Number: 5,075,857
[45] Date of Patent: Dec. 24, 1991

[54] UNMANNED COMPLIANCE MONITORING DEVICE

[76] Inventor: Joseph S. Maresca, P.O. Box 646, Bronxville, N.Y. 10708

[21] Appl. No.: 396,768

[22] Filed: Aug. 18, 1989

Related U.S. Application Data

[63] Continuation-in-part of Ser. No. 162,572, Mar. 11, 1988, abandoned.

[51] Int. Cl.[5] .................................................. E04B 1/98
[52] U.S. Cl. ................................. 364/421; 52/167 R
[58] Field of Search ................... 364/402, 421, 527; 367/68; 52/167 R

[56] References Cited

U.S. PATENT DOCUMENTS

| | | | |
|---|---|---|---|
| 3,387,277 | 6/1968 | Singer et al. | 364/200 |
| 3,784,967 | 1/1974 | Graul | 367/68 X |
| 4,604,699 | 8/1986 | Borcherdt et al. | 364/420 |
| 4,616,320 | 10/1986 | Kerr et al. | 364/421 |
| 4,663,743 | 5/1987 | Rampuria et al. | 367/68 |
| 4,799,339 | 1/1989 | Kobori et al. | 52/167 X |
| 4,883,250 | 11/1989 | Yano et al. | 52/167 X |
| 4,899,322 | 2/1990 | Crutcher et al. | 364/421 X |
| 4,901,017 | 2/1990 | Zinke | 324/239 |

Primary Examiner—Parshotam S. Lall
Assistant Examiner—S. A. Melnick
Attorney, Agent, or Firm—Ailes Ohlandt Greely

[57] ABSTRACT

Unmanned compliance monitoring device, data communication network and transaction processing apparatus for monitoring earth tremors, collecting and reporting seismic data profiles and calculating an earthquake epicenter incorporating a solar energy module, portable telephone and satellite.

4 Claims, 40 Drawing Sheets

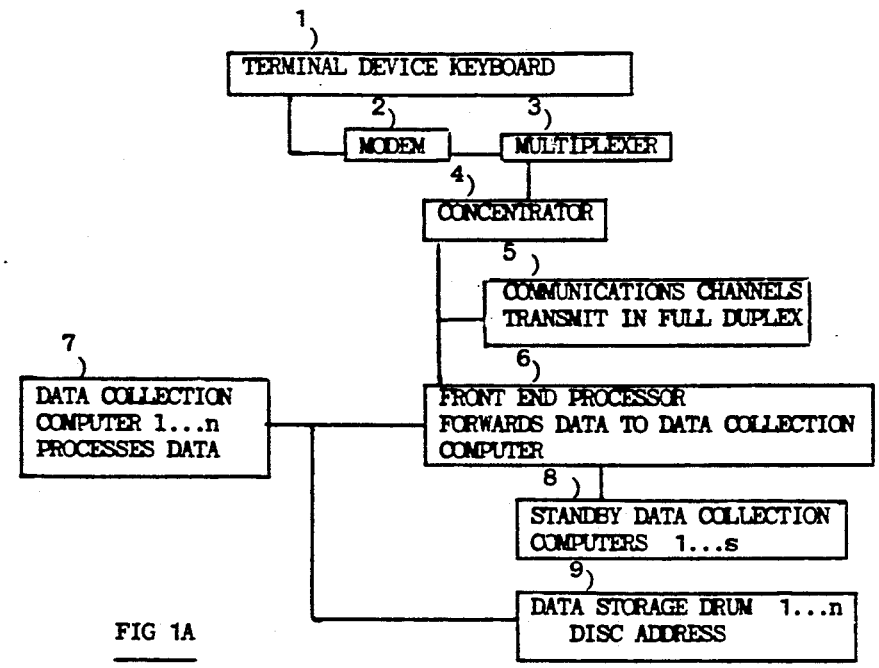

FIG 1A

| SAMPLE REPORT | OUTPUT MENUS CONTENTS | DISC SERIES | SURFACE | TRACK | CONTENTS | RECORD # |
|---|---|---|---|---|---|---|
| 1 | BUDGET FACTOR ANALYSIS | 101 | | 1 | BUDGET FACTOR DATA, ECONOMIC & COST DATA | |
| 2 | NATIONAL INCOME & DOW PROJECTIONS | 102 | | | | |
| 3 | COST MINIMIZATION & DECOMPOSITION ALGORITHYM | 103 | | | | |
| 4 | EARTHQUAKE TREMOR MEASUREMENT | 201 | | 2 | UNMANNED COMPLIANCE MONITORING DATA (UCMD) | |
| 5 | UNMANNED COMPLIANCE MONITORING DEVICE-CRITICAL EVENTS | 202 | | | | |
| 6 | UCMD-DEFINITIONAL MENU & TRAINING SCREEN | 203 | | | | |
| 7 | SAMPLE GOVERNMENT STANDARDS MENU FOR ADMINISTERING UCMD | 204 | | | | |
| 8 | SAMPLE REVIEW GUIDES FOR INSPECTING THE UCMD | 205 | | | | |
| 9 | FEDPLAN AGENCY MENUS | 301 | | 3 | FEDPLAN AGENCY DATA | |
| 10 | CRITICAL PATH OF PAIN DIAGNOSTIC MENU | 401 | | 4 | PAIN MEASUREMENT DATA | |
| 11 | HEALTH, EDUCATION & WELFARE MENUS (HEW) | 501 | | 5 | HEW DATA | |
| 12 | HEW IMPLEMENTATION MENU OF INSTRUCTION | 502 | | | | |
| 13 | WORKSTATION TRAINING CENTER MENUS | 601 | | 6 | WORKSTATION TRAINING MENUS & DATA | |
| 14 | WORKSTATION PRODUCTIVITY CENTER MENUS | 701 | | 7 | WORKSTATION PRODUCTIVITY MENUS | |
| 15 | SOLAR ENERGY UTILITY ESCALATION MENU | 801 | | 8 | SOLAR ENERGY UTILITY MENUS | |
| 16 | TRAFFIC MONITORING MENUS | 901 | | 9 | TRAFFIC MONITORING DATA | |

FIG. 1B

DATA ENTRY FORMATS

11) DIAL 100 SERIES TO UPDATE BUDGET FACTOR ANALYSIS FORMATS

12) DIAL 101 ENTER KEY,CURRENT FISCAL YEAR,CURRENT FISCAL YEAR DATA,PRIOR FISCAL YEAR,PRIOR FISCAL YEAR DATA,CURRENT PUBLIC DEBT PER CAPITA, PRIOR PUBLIC DEBT PER CAPITA

13) DIAL 102 ENTER KEY,NATIONAL INCOME YEAR,NATIONAL INCOME LEVEL,DOW JONES INDUSTRIALS YEAR, DOW JONES INDUSTRIALS LEVEL

14) DIAL 103 ENTER KEY,OBJECTIVE FUNCTION,LINEAR PROGRAMMING CONSTRAINTS

15) DIAL 201 ENTER,KEY,DISTANCE OF EPICENTER FROM STATION,MAGNITUDE OF SEISMIC DISTURBANCE

16) DIAL 202 ENTER KEY,CENTRAL PROCESSING UNIT OPERATING SYSTEM ERROR,NONWORKING GROUND SENSOR,NONWORKING STORAGE DEVICE,NONOPERATING PHOTOVOLTAIC ENERGY MODULE,TIMING OUTAGE

17) DIAL 203 ENTER KEY, DEFINITIONAL MENU & TRAINING SCRIPT

18) DIAL 204 ENTER KEY,GOVERNMENT STANDARDS MENU FOR ADMINISTERING THE UCMD

19) DIAL 205 ENTER SAMPLE REVIEW GUIDELINES FOR INSPECTING THE UCMD

20) DIAL 301 ENTER KEY,GOALS,FUNDING STATISTICS,CHARTER PROVISIONS

21) DIAL 302 ENTER SAMPLE GOALS MENU SCREEN FOR OFFICE OF STRATEGIC PLANNING

22) DIAL 401 ENTER HOSPITAL TREATMENT CENTER LOCATION,PATIENT KEY IDENTIFIER, HOSPITAL CENTER/UNIT,PATIENT CASE NUMBER,PAIN EVENT INCIDENT, TIME OF PAIN EVENT,CRITICAL PATH OF PAIN,TIMING OF PAIN MESSAGE, EVENT STATUS

23) DIAL 501 ENTER KEY,NAME,APPROVED CREDIT LINE,ACCUMULATED VOUCHERS PROCESSED AGAINST THE APPROVED CREDIT LINE,TOTAL LOANS MADE,ACCUMULATED PAYMENTS MADE TO DATE

24) DIAL 502 ENTER HEALTH,EDUCATION & WELFARE MENU OF INSTRUCTION

25) DIAL 601 ENTER KEY,OPERATOR NUMBER,TIME,MODE  T TRAINING

26) DIAL 701 ENTER KEY,OPERATOR #,TIME, P PRODUCTIVITY JOB TASKS

27) DIAL 801 DISPLAY SOLAR ENERGY UTILITY LIGHTING MENU

28) DIAL 802 DISPLAY SOLAR ENERGY COMPANY PROBLEM DETECTION FILE ORGANIZATION

29) DIAL 901 DISPLAY TRAFFIC MONITORING STATISTICS

BACKGROUND: THE MENU EXPLAINS SEVERAL IMPORTANT FACTORS WHICH ARE CRITICAL TO THE INTERPRETATION OF ECONOMIC PERFORMANCE. ALTHOUGH ALL OF THE FACTORS ARENT CITED, THE MORE IMPORTANT ONES ARE LISTED.

THE AUTHOR'S BUDGETARY FACTOR ANALYSIS BFA TAKES A CURRENT FISCAL YEAR OVER A PRIOR FISCAL YEAR TO DEVELOP A RATIO OR FACTOR FOR BUDGETARY COMPARISON PURPOSES. THE FORMULA IS THE CURRENT YEAR BUDGET ITEM/PRIOR BASE YEAR RESULTING IN THE RELEVANT FACTOR MEASUREMENT. BY EXAMPLE, THE AUTHOR WILL DEVELOP A SERIES OF RATIOS TAKING THE MID 1980'S BUDGET FIGURES DIVIDED BY THE EARLY 1980'S BASE YEAR TO DERIVE RATIOS OR FACTORS FOR THE MAJOR BUDGET CATEGORIES. THE AUTHOR RECOGNIZES THAT INDIVIDUAL INCREMENTS IN THE SPENDING CATEGORIES MAY BE NECESSARY TO ADVANCE SHORT TERM POLICY GOALS; HOWEVER, THE GOAL FOR THE LONG TERM WILL BE TO ACHIEVE SPENDING LEVELS WITHIN A REASONABLE AND PREDEFINED RELEVANT RANGE-TAKING INTO CONSIDERATION ACTUARIAL DIMENSIONS, AS WELL AS, SPENDING LIMITS WITHIN A REASONABLE RELEVANT RANGE OF THE CURRENT REVENUE FACTORS AND PLANNED ENHANCEMENTS.

THE AUTHOR'S PUBLIC DEBT PER CAPITA FACTOR ANALYSIS PREDEFINES THE HISTORICALLY ROOTED AVERAGE PUBLIC DEBT PER CAPITA FACTOR AT 2.1 INCLUDING THE YEARS 1940-50 & 1.6 EXCLUDING THOSE YEARS. THE CURRENT PUBLIC DEBT PER CAPITA FACTORS COMPORT WITH THE HISTORICAL DATA TAKEN FROM 1890 TO THE PRESENT.

THE AUTHOR'S STOCK MARKET TREND ANALYSIS MAKES PROJECTIONS OF THE NATIONAL INCOME IN RELATION TO THE DOW JONES AND FORMULATES A TREND ANALYSIS TO PROJECT THE DOW JONES AVERAGES INTO THE NEXT CENTURY. FUTURE TRENDS ARE BASED UPON PAST HISTORY OVER SEVERAL DECADES. THE LINEAR REGRESSION SLOPE IS .2018 AND INTERCEPT IS 588.3. THE COEFFICIENT OF CORRELATION IS 88%, AS REGARDS THE LINEAR REGRESSION BETWEEN THE NATIONAL INCOME AND DOW JONES INDUSTRIAL AVERAGE. SIMILARLY, THE REGRESSION STATISTICS FOR THE DOW JONES TREND LINE ARE A SLOPE OF 23.2, INTERCEPT OF .45 AND COEFFICIENT OF CORRELATION OF .84.

DEFINITIONAL MENU ON TRACK 1
THE FOLLOWING MENU WILL EXPLAIN THE VARIOUS DEFINITIONS OF SUBSCRIPTS USED IN THE MATHEMATICAL MODEL TO FOLLOW.

o $L_1$ REPRESENTS PROFESSIONAL AND LEGAL COSTS.

o $L_2$ REPRESENTS SUPPORT STAFF COSTS.

o $M_1$ REPRESENTS MATERIALS AND SUPPLIES.

o $O_v$ REPRESENTS OVERHEAD COSTS.

o THE SUBSCRIPT $\underline{A}$ AS IN $L_{A1}$ DESIGNATES A COST EQUATION DEPICTING AN ALTERNATIVE.

o THE SUBSCRIPT $\underline{P}$ AS IN $L_{P1}$ DESIGNATES A COST EQUATION DEPICTING THE SELECTION COSTS FOR CHOOSING A SPECIFIC ALTERNATIVE.

o THE $\underline{I}$ SUBSCRIPT DEMONSTRATES THE COST OF INDUSTRIAL COMPLIANCE AS $L_{I1}$.

o THE $\underline{M}$ SUBSCRIPT DESIGNATES THE COST ASSOCIATED WITH GOVERNMENTAL MONITORING FOR COMPLIANCE. ADDITIONAL LEVELS MAY BE ADDED FOR THE VARIOUS LEVELS OF GOVERNMENTAL MONITORING. THE $\underline{M}$ SUBSCRIPT IS USED IN THE SET OF GOVERNMENTAL MONITORING EQUATIONS $L_{M1}$.

FIG. 6

TO ILLUSTRATE INPUT OF CRITICAL PAIN INCIDENTS ON TRACK 4 OF THE DATA DRUM

TO ILLUSTRATE INPUT OF SOCIAL WELFARE CREDIT LINES ON TRACK 5 OF THE
DATA DISC DRUM

116
HEALTH, EDUCATION AND WELFARE ORGANIZATIONAL DESIGN
MODULE ON TRACK 5
USER PROMPT? PURPOSE

117
BACKGROUND MENU ON TRACK 5
THE PURPOSE OF THE MODULE IS TO PROVIDE A PHASED IN
CAREER DEVELOPMENT PROGRAM FOR FAMILIES ON PUBLIC
ASSISTANCE PROGRAMS AND OTHER PERSONS REQUIRING LONG
TERM PUBLIC ASSISTANCE. THIS PROGRAM IS DESIRABLE
BECAUSE IT PROVIDES PERSONS ON PUBLIC WELFARE WITH
LONG TERM CAREER DEVELOPMENT OPTIONS. SIMILAR TO THE
NEW DEAL, THIS PROPOSAL IS PRODUCTIVITY-BASED.

118
DATA INPUT TRACK 5
KEY, NAME, APPROVED CREDIT LINE, ACCUMULATED VOUCHERS PROCESSED
AGAINST THE APPROVED CREDIT LINE, TOTAL LOANS MADE, ACCUMULATED
PAYMENTS MADE TO DATE

119
USER PROMPT? IMPLEMENTATION

IMPLEMENTATION MENU IS DISPLAYED ON TRACK 5
THE FOLLOWING SET OF PROCEDURES WILL BE EMPLOYED TO STRUCTURE A PILOT
PROGRAM FOR FULL IMPLEMENTATION OF THE CAREER DEVELOPMENT MODULE FOR
HEADS OF HOUSEHOLDS ON FAMILY PUBLIC ASSISTANCE.
1. THE UNITED STATES DEPARTMENT OF LABOR IN COOPERATION WITH THE OFFICE
   OF TECHNOLOGY ASSESSMENT SHALL CONDUCT AN EXTENSIVE SURVEY COVERING
   THE NEEDS OF PERSONS ON PUBLIC ASSISTANCE. POTENTIAL CAREER OPTIONS
   AND THE CURRENT OR PROJECTED FUTURE MARKET REQUIREMENTS...
A SAMPLE PAYMENT SCHEDULE FOR A $14,000. LOAN REPAYMENT OVER 30 YEARS IS
PROVIDED BELOW.

| ATTAINED INCOME LEVEL | REPAYMENT SCHEDULE |
|---|---|
| $10,000. PER YEAR | 0 |
| 12,000. PER YEAR | $300. PER YEAR |
| 18,000. PER YEAR | 600. PER YEAR |
| 25,000. PER YEAR | 900. PER YEAR |
| 30,000. PER YEAR | 1200. PER YEAR |

THE FINAL IMPLEMENTATION PLAN WILL REQUIRE APPROVAL BY APPROPRIATE GOVERNMENTAL
AUTHORITIES.

FIG. 18

TO ILLUSTRATE DATA GATHERING OF NONWORKING SOLAR ENERGY UTILITY LIGHTS
ON TRACK 8 OF THE DATA DISC DRUM

161

SOLAR ENERGY UTILITY LIGHTING MENU ON TRACK 8 MENU 801
THE SOLAR ENERGY UTILITY POLE WILL PROVIDE LIGHT, PARTICULARLY, IN SUBURBAN AREAS WHERE IT MAY BE TOO COSTLY TO PROVIDE ELECTRIC LIGHTING ALONG HIGHWAYS. THE SOLAR ENERGY UTILITY POLE AND TROUBLE ESCALATION SYSTEM FUNCTIONS INDEPENDENTLY, AS REGARDS, THE COLLECTION OF SOLAR ENERGY DURING THE DAY IN ORDER TO PROVIDE LIGHT FOR MOTORISTS AT NIGHT. THE TOP PORTION OF THE UTILITY POST CAPTURES SOLAR ENERGY BY USING A STANDARD SOLAR ENERGY PANEL INTERFACE WITH THE SUN. THE LIGHT TURNS ON IN THE EVENING WHEN A RESIDENT SENSOR DETECTS DARKNESS. A MUNICIPAL UTILITY COMPANY PROBLEM DETECTION SYSTEM INTERFACES WITH ALL UTILITY POLES IN ORDER TO QUERY THE OPERATIONAL STATUS OF THE SENSOR. A "0" ANSWERBACK INDICATES THAT THE UTILITY POLE SENSOR IS NOT OPERATIONAL; WHEREAS, A "1" ANSWERBACK WILL SIGNAL THE "WORKING"OPERATIONAL STATUS OF THE SENSOR.

162

CENTRAL PROCESSOR UNIT

163

QUERIES UTILITY POLE SENSORS
0 ANSWERBACK- NONOPERATIONAL; 1 ANSWERBACK-OPERATIONAL

164

SOLAR ENERGY UTILITY COMPANY PROBLEM DETECTION
FILE ORGANIZATION ON TRACK 8 MENU 802
KEY, LOCATION OF SUBSYSTEM, NONWORKING OR UNVALIDATED SENSOR CONDITION, ESCALATION LEVEL, DATE OPENED, CLOSURE

165

SOLAR ENERGY UTILITY COMPANY PERIODIC STATISTICAL
MENUS/REPORTS ON TRACK 8

TOTAL NUMBER OF UNVALIDATED SENSOR CONDITIONS DETECTED BY SATELLITE INTERFACE, ESCALATION LEVELS, EVENTS CLOSED, OUTSTANDING/UNRESOLVED ITEMS.

FIG. 22

TO ILLUSTRATE THE PROBLEM DETECTION FILE FOR THE SOLAR ENERGY UTILITY POLE

TO ILLUSTRATE THE BINARY DATA ORGANIZATION FOR THE MEASUREMENT OF NUCLEAR WASTE EVACUATION CONDITIONS

TO ILLUSTRATE THE REPORTING OF HIGHWAY TRAFFIC STOPPAGES ON TRACK 9 OF THE DATA DISC DRUM

194
)
```
┌─────────────────────────────┐
│ TERMINAL INPUT DIALUP 202   │
└─────────────────────────────┘
```
195)
```
┌──────────────────────────────────────────────────────────────┐
│ ENTER YEAR, NATIONAL INCOME, DOW JONES INDUSTRIAL INDEX DATA │
│        1960,   424,625                                       │
│        1965,   585,905                                       │
│        1970,   833,736                                       │
│        1975,  1289,756                                       │
│        1980,  2203,879                                       │
│        1985,  3222,1369                                      │
└──────────────────────────────────────────────────────────────┘
```
196 )
```
┌──────────────────────────────────────────────────────────┐
│ DISPLAY                                                  │
│ MINIMUM NATIONAL INCOME & DOW JONES INDUSTRIALS FIGURES  │
└──────────────────────────────────────────────────────────┘
```
197)

| YEAR | MINIMUM NATIONAL INCOME | DOW JONES INDUSTRIALS |
|------|------------------------|----------------------|
| 1960 | 424 | 625 |
| 1965 | 585 | 905 |
| 1970 | 833 | 736 |
| 1975 | 1289 | 756 |
| 1980 | 2203 | 879 |
| 1985 | 3222 | 1369 |
| FUTURE | 3500 | 1294 |
|  | 4000 | 1395 |
|  | 4500 | 1496 |
|  | 5000 | 1600 |

COEFFICIENT OF CORRELATION 88%

| YEAR | MINIMUM DOW JONES INDUSTRIALS | MAXIMUM DOW JONES INDUSTRIALS |
|------|-------------------------------|-------------------------------|
| 1960 | 625 | |
| 1965 | 905 | |
| 1970 | 736 | |
| 1975 | 756 | |
| 1980 | 879 | |
| 1985 | 1369 | |
| 1990 | 1295 | |
| 1995 | 1410 | 2950 |
| 2000 | 1526 | 3200 |
| 2010 | 1758 | 3850 |
|  |  | 4000 |
|  | FLOOR FIGURES | CEILING FIGURES |

COEFFICIENT OF CORRELATION 84%.

FIG. 28

TO ILLUSTRATE A SAMPLE OUTPUT MENU FOR CALCULATING FEDERAL GOVERNMENTAL COSTS ON TRACK 1 MENU 103

214
CENTRAL PROCESSOR RECEIVES MESSAGE BINARY 1
INDICATING NEUROTRANSMITTERS WERE RELEASED

215
UPDATES TRACK 4 ON THE DATA DISC DRUM

216
DISPLAYS OUTPUT MENU   401

COUNTY GENERAL HOSPITAL
PATIENT  10001
PAIN INCIDENT AT  4:01
OPEN STATUS

FIG. 33

TO ILLUSTRATE THE OUTPUT MENU OF SOCIAL WELFARE CREDIT LINES ON TRACK 5

217  
TERMINAL INPUT DIALUP 501

218  
ENTER CREDIT DATA

CASE 100, $10000, $2,000., $5000., $500.

219  
DISPLAY OUTPUT MENU 501

CASE 100
| | |
|---|---|
| APPROVED CREDIT LINE | $10,000. |
| ACCUMULATED VOUCHERS | 2,000. |
| TOTAL LOANS MADE | 5,000. |
| ACCUMULATED PAYMENTS | 500. |

FIG. 34

TO ILLUSTRATE THE SOLAR ENERGY UTILITY ESCALATION MENU 801 ON TRACK 8

TO ILLUSTRATE OPERATION OF THE BINARY TEST CONDITION FOR EVACUATION OF NUCLEAR WASTE

TO ILLUSTRATE THE REPORTING OF HIGHWAY TRAFFIC STOPPAGES ON
OUTPUT MENU 901

234) INPUT "0" NON-OPERATING CONDITION, 5:00 PM, HIGHWAY 100, CRITICAL

235) UPDATE TRACK 9 OF THE DATA DISC DRUM

236) DISPLAY OUTPUT MENU 901
NON-OPERATING CONDITION
CRITICALITY LEVEL-HIGH
HIGHWAY 100
TIME: 5:00 PM.

FIG. 39

| SAMPLE REPORT | CONTENTS |
|---|---|
| 1 | BUDGET FACTOR ANALYSIS |
| 2 | NATIONAL INCOME & DOW PROJECTIONS |
| 3 | COST MINIMIZATION & DECOMPOSITION ALGORITHYM |
| 4 | EARTHQUAKE TREMOR MEASUREMENT |
| 5 | UNMANNED COMPLIANCE MONITORING DEVICE CRITICAL EVENTS (UCMD) |
| 6 | UCMD-DEFINITIONAL MENU & TRAINING SCREEN |
| 7 | SAMPLE GOVERNMENT STANDARDS MENU FOR ADMINISTERING THE UCMD |
| 8 | SAMPLE REVIEW GUIDES FOR INSPECTING THE UCMD |
| 9 | FEDPLAN AGENCY MENUS |
| 10 | CRITICAL PATH OF PAIN DIAGNOSTIC MENU |
| 11 | HEALTH, EDUCATION & WELFARE MENUS |
| 12 | HEW IMPLEMENTATION MENU OF INSTRUCTION |
| 13 | WORKSTATION TRAINING CENTER MENUS |
| 14 | WORKSTATION PRODUCTIVITY CENTER MENUS |
| 15 | SOLAR ENERGY UTILITY ESCALATION MENU |
| 16 | TRAFFIC MONITORING MENUS |

FIG. 40

UNMANNED COMPLIANCE MONITORING DEVICE

This is a continuation-in-part of application Ser. No. 162,572, filed Mar. 11, 1988, now abandoned.

BACKGROUND OF THE INVENTION

1. Field of the Invention

The invention in the preferred mode relates to an improved data sending, receiving and processing arrangement for communications network system which consist of economic subsystems government budgeting and actuarial subsystems, earthquake measurement systems, social welfare and career development subsystems, reconfigured workstation processes, municipal transportation subsystems and nuclear energy subsystems. The various subsystems enter the same communications network, all data are entered by the same unique dialup protocol and processed by the data collection computer with results of processing stored on specific tracks of the data disc drum, each track number corresponding to the first digit of the output report number sequences.

2. Description of Prior Art

A conventional communications network receives and processes data at the front end processor or data collection computer. Frequently, data entry formats are non-standardized and there is little consistency in addressing the system or interpreting the processing results. The invention provides for a simple and consistent data entry format with history data centralized on various tracks of a single (or multiple) data storage drums. This unique design facilitates data entry, data collection and data retrieval by relatively unskilled operators. The data communications network and processing apparatus transmits data, performs various numerical calculations, transmits in full duplex, processes data at the data collection computer and updates files on specific tracks or the data storage drum. The transaction processing apparatus updates the production files automatically and provides users with an instantaneous view of the production file immediately following the most recent input of new data by the operator. In addition to an instantaneous update of the production file, the apparatus performs various data collection and compilation calculations of the data and displays the results on the menu screen. Specifically, the transaction processing apparatus measures earthquake tremors and nuclear tests utilizing the unique dialup format; whereupon, data is formatted and transmitted utilizing a simple dialup to the central processor and update of production files on specific tracks of the data disc drum. The modular design has self-sustaining solar energy subsystems and advanced electronic sensing devices which interface with the satellite using the simple dialup steps. The system is linked to a series of government planning and monitoring systems which track critical economic indices and budgetary statistics using the linear programming decomposition theorems. The system has a career development module appended to the social welfare system, as well as, a work at home system designed to interface workers with modular work centers. There is a medical diagnostic pain identification system which maps the critical path of pain messages as they travel through the body. There are strategic management systems to measure and monitor traffic stoppages, redirect traffic and detect lighting pole outtages by a linkage to sensing devices. There is a system module which detects the critical nuclear waste masse prior to evacuation in outerspace. All systems and subsystems are processed utilizing the same communications network, dialup protocol, data entry and processing by the data collection computer, and data storage on specific tracks of the data storage drum with output report sequencing corresponding to the first digit of each track on the data storage drum.

SUMMARY OF THE INVENTION

The present invention comprises a data entry terminal which interfaces with the data collection computer over a communications network which may comprise a concentrator(s) and transmission in full duplex mode. The data is received and processed by the data collection computer and files are updated on specific tracks of the data disc drum. The data is updated on the drum according to very specific dialup input formats. These input formats are standard for all users. There is a specific input format for each category of processing to include economic and budgetary data, earthquake measurement data, career development and social welfare data, the measurement of pain incidents, the measurement of nuclear waste material and the accumulation of traffic stoppage data. The specific input format is best illustrated by the dialup to the data collection computer and instantaneous update of computer files on specific tracks 1–9 of the data disc drum. All systems are unified into a single data processing arrangement as shown on FIG. 1.

BRIEF DESCRIPTION OF THE DRAWINGS

The present invention is a transaction receiving and processing apparatus and an improved network communications arrangement for receiving and processing economic and scientific data transmitted over a communications network. The essence will be more apparent from the ensuing description with reference to the accompanying drawings; wherein, FIGS. 1a and 1b is a block diagram depicting a model of the communications network and transaction processing arrangement. The model has a unique dialup to the data collection computer with instantaneous update of economic and scientific files on specific tracks of the data disc drum and corresponding output report sequences; whereupon, the first digit of each report sequence corresponds to the track number on the data disc drum storage device.

FIG. 2 is a block diagram depicting specific data entry dialup formats to the data collection computer.

FIG. 5 is a block diagram depicting background data on economic performance.

FIG. 6 is a block diagram depicting definitions of key inputs to the federal government cost analysis model.

FIG. 18 is a block diagram depicting implementation of the social welfare system on track 5 of the data disc drum.

FIG. 22 is a block diagram depicting a solar energy problem detection system on track 8 of the data disc drum.

FIG. 28 is a block diagram depicting sample national income and Dow Jones Industrial Average Index data and projections.

FIG. 33 is a block diagram depicting pain detection and measurement on track 4 of the data disc drum.

FIG. 34 is a block diagram depicting sample social welfare credit lines and career development loans made to recipients on social welfare.

FIG. 39 is a block diagram depicting the measurement of highway traffic stoppages on track 9 of the data disc drum.

FIG. 40 is a block diagram depicting sample output reports, track numbers on the data disc drum and descriptions. The presentation provides users with a snapshot of all output reports and the location of the data which produces these reports.

DESCRIPTION OF THE PREFERRRED EMBODIMENTS

Figure 3:
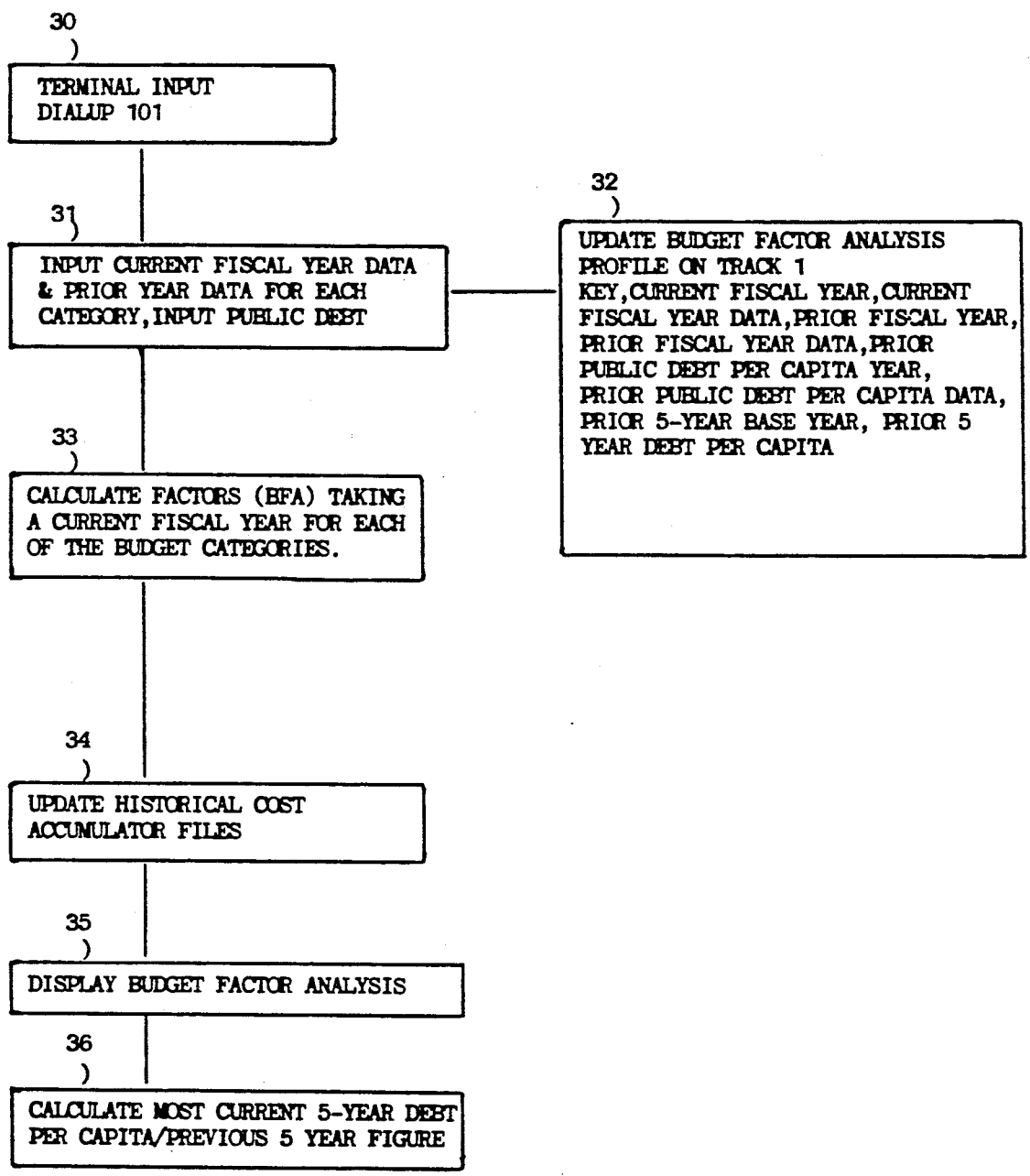
FIG. 3 is a block diagram depicting inputs for the national budget and public debt.

A data processing system and communications network for processing economic data and trends, actuarial and budget systems, career development systems to supplement existing social welfare, municipal transportation subsystems, nuclear and solar energy subsystems and medical technology subsystems. The data processing arrangement includes a memory or database for storing various classifications of data by user category. The system may be implemented by any digital data processing equipment and comunications network known to practitioners in the art, e.g. any common bus system interconnecting a digital processor, manual data entry terminal apparatus or cost efficient data entry terminal apparatus described in this document, a data storage drum(s), an output signalling structure; such as, a cathode tube display, high speed printer and communications network consisting of a modem(s) to convert digital computer equipment signals from the pulse form in which it is stored to the wave form before analog transmission, a multiplexer to combine the input streams from several terminals into a single input stream which can be sent over a single channel, a concentrator which allocates communications channels from several terminals, a full duplex channel which can transmit data in both directions simultaneously and a data collection computer to process data. The detection of motion, volume, light and chemical substances described in this applications may be implemented by any common electronic sensing device known to practitioners of the art.

In the preferred mode, the user first enters data by using a specific dialup format to the central processor, and production data is updated for the various classifications of data including budgetary and economic data on track 1 of the data disc drum, earthquake monitoring and nuclear test data on track 2, federal planning data on track 3, pain measurement data on track 4, Health, Education and Welfare data on track 5, workstation training menus on track 6, workstation productivity data on track 7, solar energy utility data on track 8 and traffic monitoring data on track 9 of the data disc drum. To facilitate system setup, entry of information onto the database and processing of data, reports and menus, it is desireable to provide for relatively simple data entry which may be done by an unskilled operator. The recommended data entry scheme is a specific dialup format which addresses the data collection computer in a specific protocol beginning with the numbers in the 100 series for budgetary and economic data, the 200 series for earthquake monitoring and nuclear test data, the 300 series for federal planning data, the 400 series for pain measurement data, the 500 series for health, education and welfare data, the 600 series for workstation training menus, the 700 series for productivity menus, the 800 series for solar energy utility data and the 900 series for traffic monitoring statistics.

The output menus conform to the input numbering sequence listed previously. The system may be coded in any programming language selected by the user and variables may be formatted in any form which comports with the particular rules of the programming language selected.

FIG. 1 is a block diagram depicting a model of the communications network and transaction processing arrangement. The hierarchical menu arrangement comports with the sequencing of the data entry dialup protocols and the sequencing of the output reports and menu screens. It should be noted that the illustrations in the drawings are for overview purposes and only a single menu at a time is displayed to the operator viewing the cathode tube screen. It is further noted that each displayed line of the output menus (series 100-900) bears an individual address on the data disc drum. Each menu or data entry point is addressed by entering an appropriate keystroke or command relative to the address desired (i.e. dial 301 to view the FEDPLAN agency menus. Thereafter, the appropriate menu or entry line will be displayed and samples of the menus are shown with live data on the illustrations contained herein. On the FIG. 1, the operator will address the system by dialing up the appropriate data entry format on the data storage drum. A numeral 1 represents the operator dialup of the system, a 2 represents a modem interface which converts the data from the pulse form in which it is stored to the wave form before analog transmission, when a digital transmission is used, data are transmitted in pulse form whereupon a conversion of the data to wave form is not necessary, 3 is a multiplexer which is a device permitting more than 1 terminal to transmit data over the same communications channel, 4 a concentrator which systematically allocates communications channels among several terminals with said concentrator having data validation capability depending on the desired speed of processing through the network and the need to eliminate or reduce error processing at the end of the cycle, a 5 represents communications channels which carry data from location to location and capable of the most versatile mode of data transmission; i.e. can transmit data in both directions simultaneously, 6 a front end processor which performs initial data processing validations i.e. data format checks and sorting prior to forwarding data to the data collection computer, 7 a data collection computer which processes the data, 8 a standby data collection computer which processes data in the event the master data collection computer malfunctions, 9 an update of the data storage drum; whereupon, budget and economic data are updated on track 1, earthquake measurement and nuclear test data are updated on track 2, FEDPLAN agency data are updated on track 3, pain measurement events are recorded and updated on track 4, health, education and welfare data are updated on track 5, workstation training menus are updated and accessed on track 6, workstation productivity menus are updated on track 7, solar energy utility pole problem management data are updated on track 8 and nuclear waste measurement and traffic monitoring data are updated on track 9 of the data disc drum. The arrangement of the data storage will be identified for all data storage drums to facilitate the consistency of all input protocols, dialogue with the system and output menus. A 10 represents the variety and organization of output menus available to users of the system. Sample menus with "live data" are illustrated later on in the document. Each output menu is numbered in the same sequence as the input on the data storage drum.

FIG. 2 is a block diagram depicting the data entry formats; such that users address the system in the same protocol. In FIG. 2, an 11 shows the operator dialup the system on 100 to update budget factors, a 12 shows the operator dialup the system on 101 to update fiscal year and public debt data, a 13 shows the operator dialup the system on 102 to updata and analyze national income and Dow Jones Industrials data, a 14 shows the operator dialup the system on 103 to enter the linear programming objective function and constraints, a 15 shows the operator dialup the system on 201 to enter earthquake measurement data, a 16 shows the operator dialup the system on 202 to enter problem management data for the unmanned compliance monitoring device, a 17 shows the operator dialup the system on 203 to access the definitional menu and training script for the unmanned compliance monitoring device, an 18 shows the operator dialup the system on 204 to access government standards for administering the unmanned compliance monitoring device, a 19 shows the operator dialup the system on 205 to display review guidelines for the unmanned compliance monitoring device, a 20 shows the operator dialup the system on 301 to enter federal planning data, a 21 shows the operator dialup the system on 302 to display sample goals for a governmental agency, a 22 shows the operator dialup the system on 401 to enter or view pain measurement data, a 23 shows the operator dialup the system to enter credit information for persons seeking government loans for career development on 501, a 24 shows the operator dialup the system on 502 to display a health, education and welfare menu of instruction, a 25 shows the operator dialup the system on 601 to place the operator of the system in a training mode, a 26 shows the operator dialup the system on 701 to place the terminal onto productivity mode, a 27 shows the operator dialup the system on 801 to enter and display solar energy utility pole problem management incidences, a 28 shows the operator dialup the system on 802 to display total statistics for the solar energy problem detection file, a 29 shows the operator dialup the system to display traffic monitoring statistics on menu 901.

FIG. 3 is a block diagram which depicts a subsystem for measuring current and historical budgetary factors using a current 5-year base period for actuarial evaluation. For purposes of FIG. 3 processing, the following variables are employed.

Figure 27:
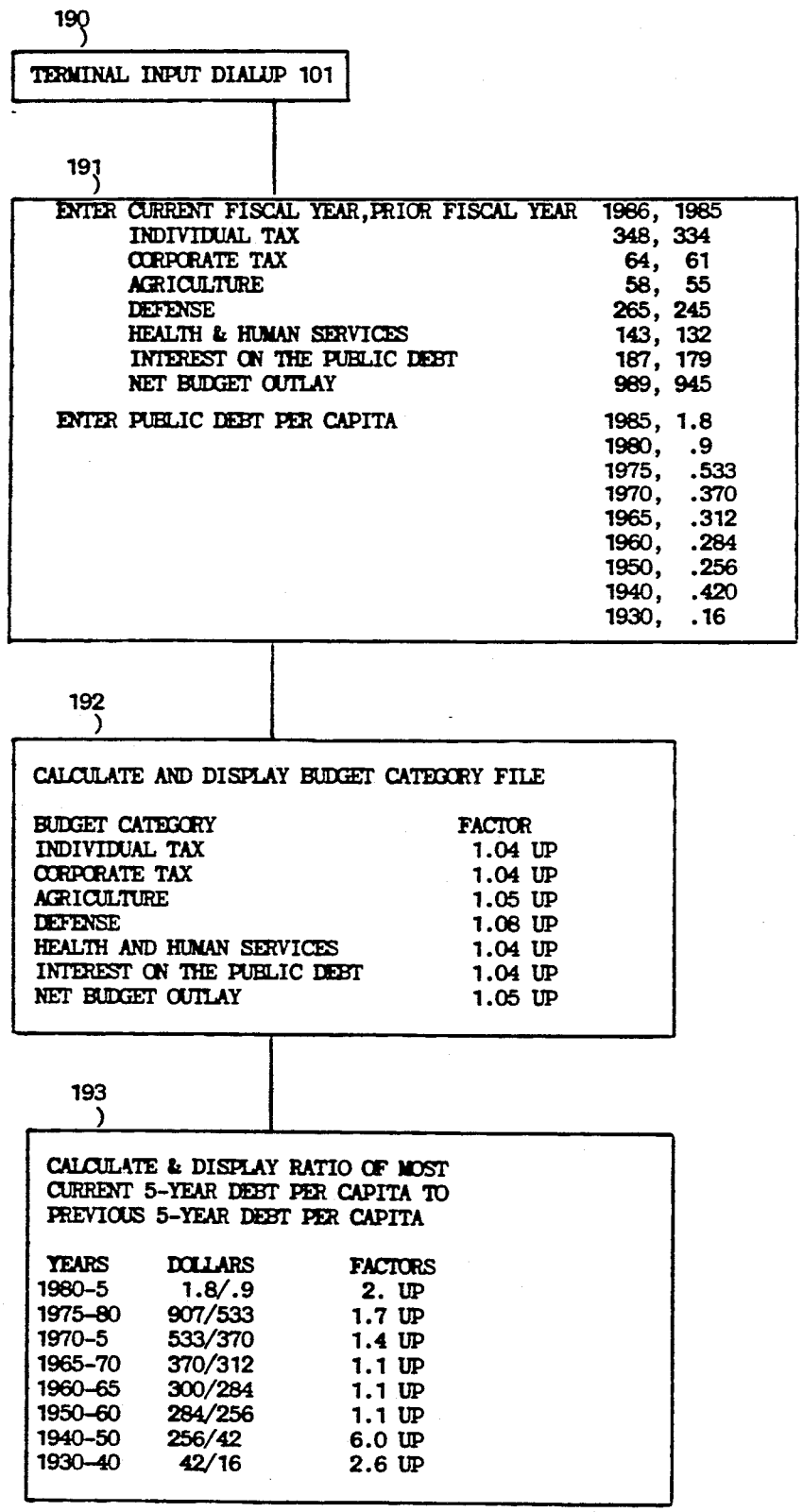
FIG. 27 is a block diagram depicting sample federal budget inputs and display of the outputs.
Figure 29:
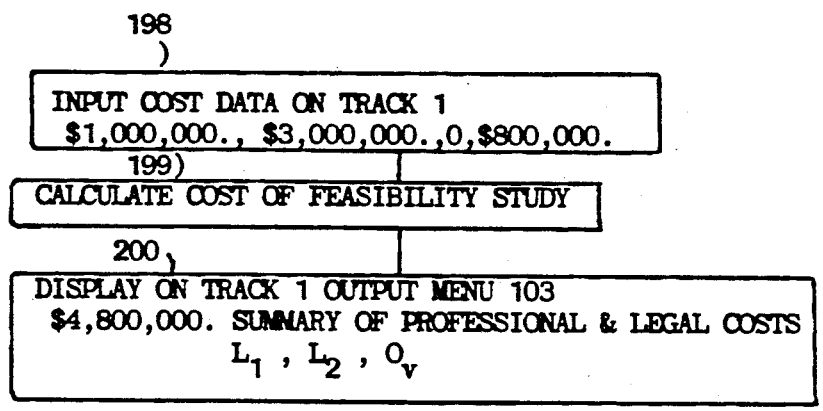
FIG. 29 is a block diagram depicting sample output for the computation of federal government costs.

| Input Variables Track 1 of the Data Disc Drum | |
|---|---|
| Current fiscal year | This data is the current fiscal year budget statistic. |
| Prior fiscal year | This data is the base year or prior year budget statistic. |
| Individual Tax Corporate Tax Agriculture Defense Health & Human Services Interest on Public Debt Public Debt per Capita | U.S. budget categories are published by the Treasury Department, Bureau of Government Financial Operations. |
| Output Variables on Track 1 | |
| 5-year ratio of most current 5-year debt per capita to previous 5-year debt per capita. Illustrated on FIG. 27 | Ratio of current debt per capita to previous 5-year debt per capita. Public debt figures are published by U.S. Treas. |

In FIG. 3, a reference numeral 30 represents the operator dialup 101 to the data processor in order to input budgetary statistics for each fiscal year actuarial evaluation. A 31 represents input of the current fiscal year and prior year data for each budget category. The prior year public debt per capita data are input together with the prior 5-year base period and debt per capita. A 32 represents an update of the budget data on track 1 of the data disc drum. A 33 represents a numeric calculation of the budget factors using a current fiscal year for each of the budget categories. A 34 updates the historical cost accumulator files. A 35 displays the budgetary factor analysis. A 36 calculates the ratio of the most current 5-year debt per capita to previous 5-year debt per capita figures.

Figure 4:
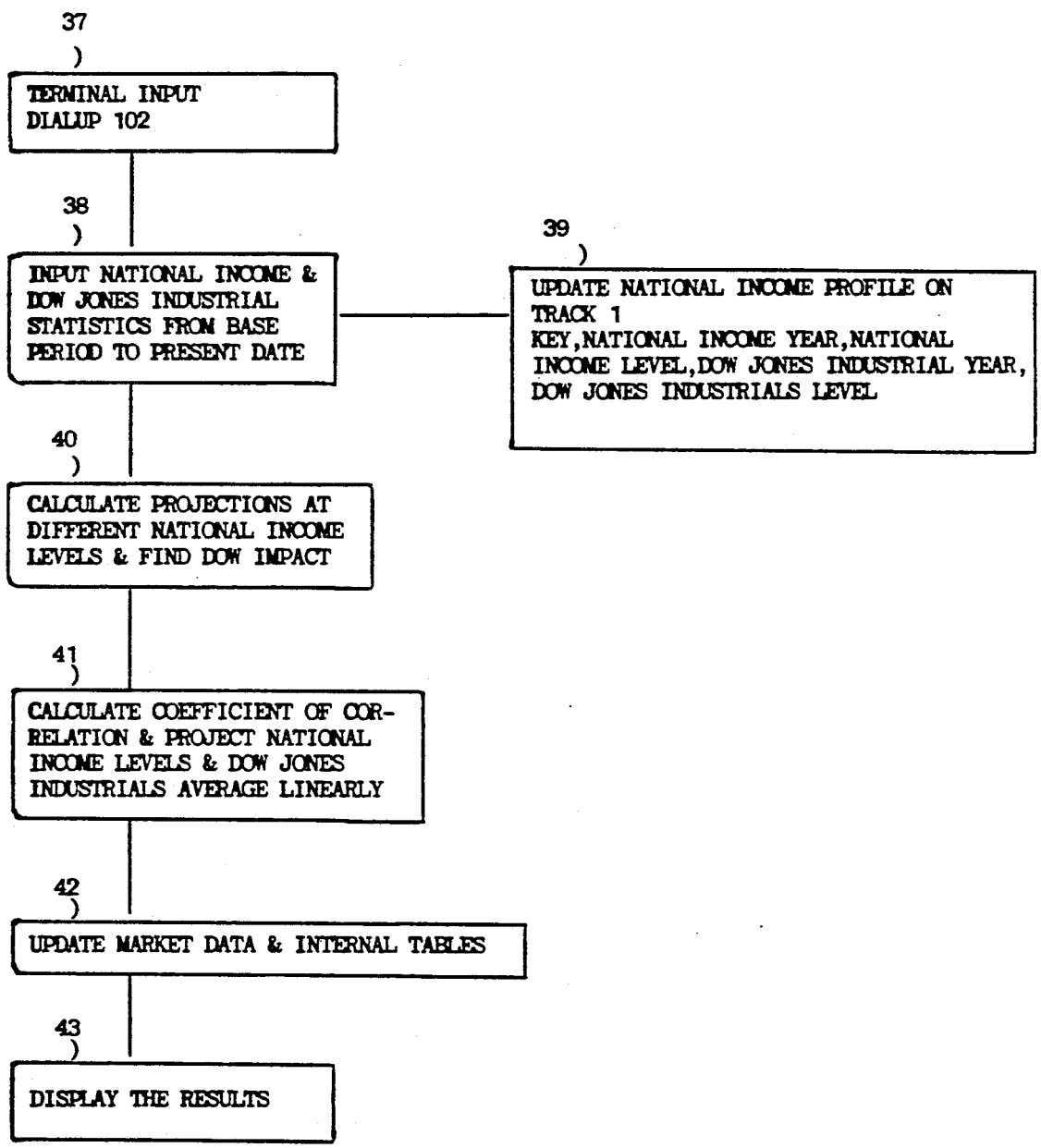
FIG. 4 is a block diagram depicting inputs for the analysis and projection of National Income and stock market trends.

FIG. 4 is a block diagram depicting a process for accumulating statistical data on stock market trends, the National Income and future projections. For purposes of FIG. 4 processing, the following variables are employed.

| Input variables Track 1 | |
|---|---|
| National Income Year | This is the year selected for analysis. |
| National Income Level | A statistic published by the Bureau of Economic Analysis which measures the sum of compensation of employees, proprietors income, rental income of persons, corporate profits adjusted, net interest |
| Dow Jones Industrial Year | The year selected for analysis. |
| Dow Jones Industrial Level | Comprises approximately 30 large corporate stocks on the Exchange. In addition, there is a Dow Jones transportation average and utility average. |
| Output variables | |
| Minimum National Income Dow Jones Industrial Min/Max Illustrated on FIG. 28 | Future figures are projected statistically with correlation coefficients of 88% & 84% respectively. |

In FIG. 4, a 37 represents an operator dialup 102 to input data onto the system. A 38 inputs the National Income and Dow Jones Industrial Average statistics from the base period to the present data, a 39 updates the National Income profile on track 1, a 40 calculates projections at different National Income levels, a 41 calculates the coefficient of correlation and projects National Income levels and the Dow Jones Industrial average linearly, a 42 updates the stock market data projections and a 43 displays results of processing.

FIG. 5 is a block diagram depicting an instructional menu which displays explanatory text for the national budget factors, the public debt and stock market trends. A reference number 44 displays the text of the menu.

FIG. 6 is a block diagram depicting an instructional menu which displays explanatory text defining the variables used in a mathematical model which measures and minimizes regulatory costs.

Figure 7:
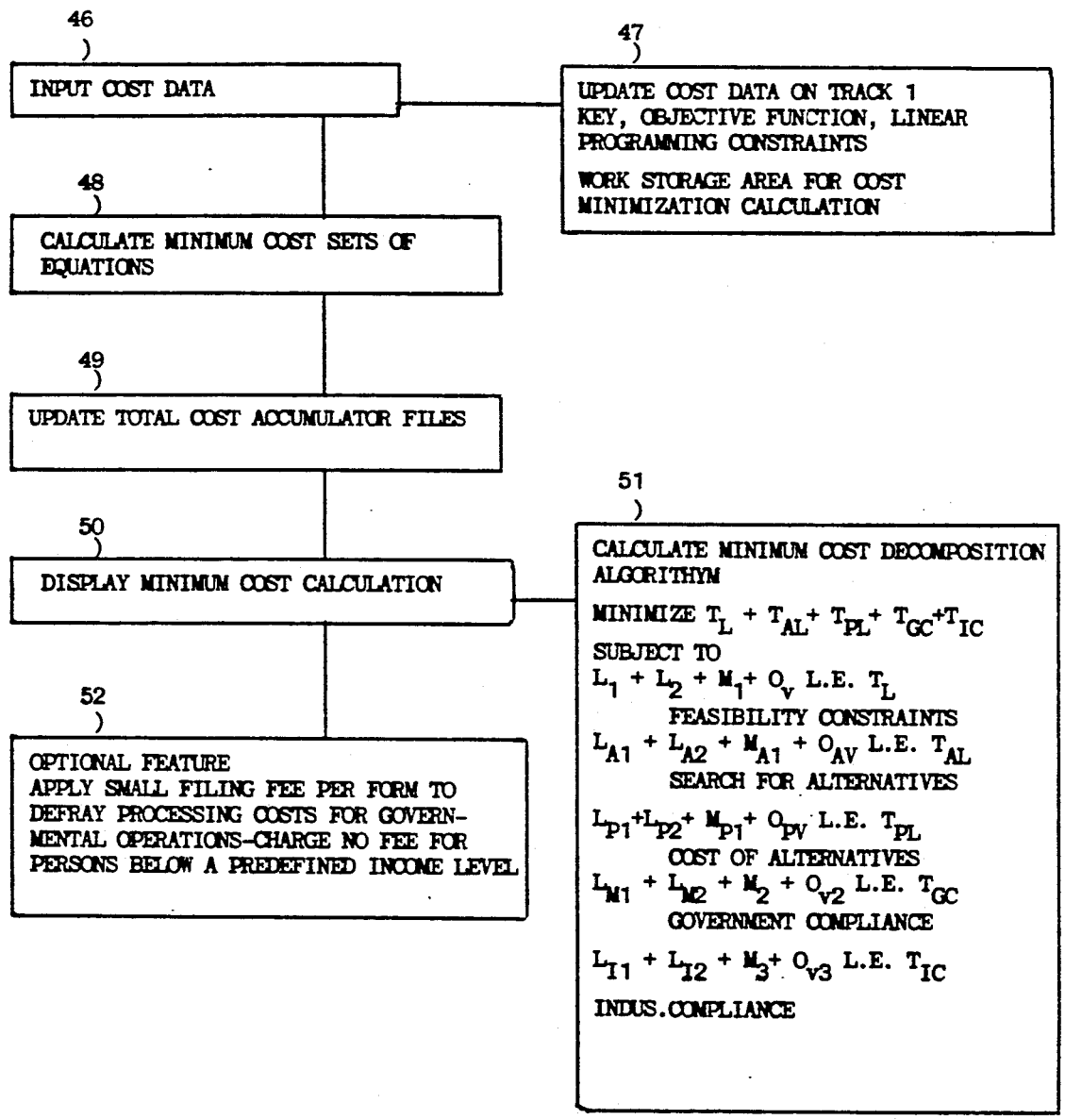
FIG. 7 is a block diagram depicting application of the linear programming cost decomposition algorithym for minimizing federal government costs.

FIG. 7 is a block diagram depicting a system which makes a cost minimization calculation resulting in the combination of total costs which represent a minimum level based on the linear programming decomposition algorithym. For purposes of FIG. 7, the following relevant variables are employed in processing.

| Input Variables on Track 1 | |
|---|---|
| $L_1$ | Professional & legal costs. |
| $L_2$ | Support staff costs |
| $M_1$ | Materials & supplies |
| $O_y$ | Overhead costs |
| Subscript A | a cost equation depicting an alternative |
| Subscript P | a cost equation depicting the selection costs for choosing a specific alternative. |
| Subscript I | demonstrates the cost of industrial compliance |
| Subscript M | designates the cost associated with governmental monitoring for compliance. |
| Objective function | the objective function sets forth an entity's objective quantitatively. |
| Linear programming constraints Illustrated on Sheet 29 | limiting factors expressed quantitatively |

In FIG. 7, a 46 represents the cost data input on track 1 of the data disc drum, a 47 represents an update of cost data on track 1 consisting of the objective function and linear programming constraints, a 48 calculates the minimum cost sets of equations, a 49 updates the total cost accumulator files, a 50 displays the minimum cost calculation, a 51 calculates the minimum cost decomposition algorithym, a 52 applies a fractional surcharge to government filings in order to defray costs.

Figure 8:
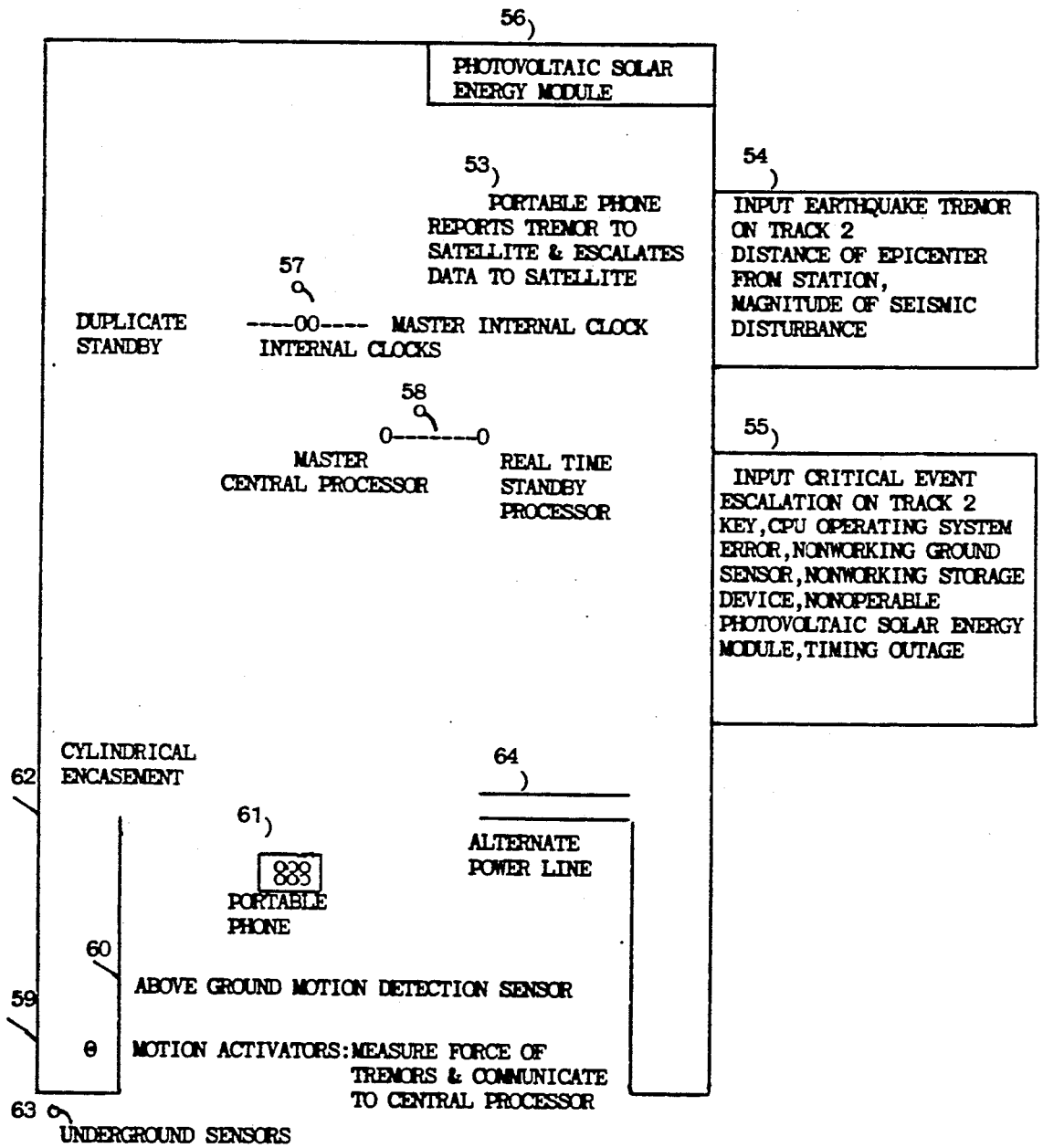
FIG. 8 is a block diagram depicting a series of subsystems to measure earthquake termors and nuclear tests; whereupon, results are stored on track 2 of the data disc drum.

FIG. 8 is a block diagram which depicts a series of subsystems to measure earthquake tremors and nuclear tests. In FIG. 8, the input variables are defined below:

| Input variables on track 2 of the data disc drum | |
|---|---|
| Distance of epicenter from station | The distance from the epicenter of the earthquake to the unmanned compliance monitoring device. |
| Magnitude of seismic disturbance | The magnitude of the seismic disturbance is expressed by the Richter logarithymic measurement scale 1–10; wherein 1.5 is the smallest quake, 4.5 is slight damage and 8.5 is a major earthquake. |
| central processing unit operating system error | an operating system error is generated by the central processing unit. The error requires routine maintenance or reformatting data. |
| nonworking ground sensor | A nonworking ground sensor requires maintenance so |

-continued

Figure 30:
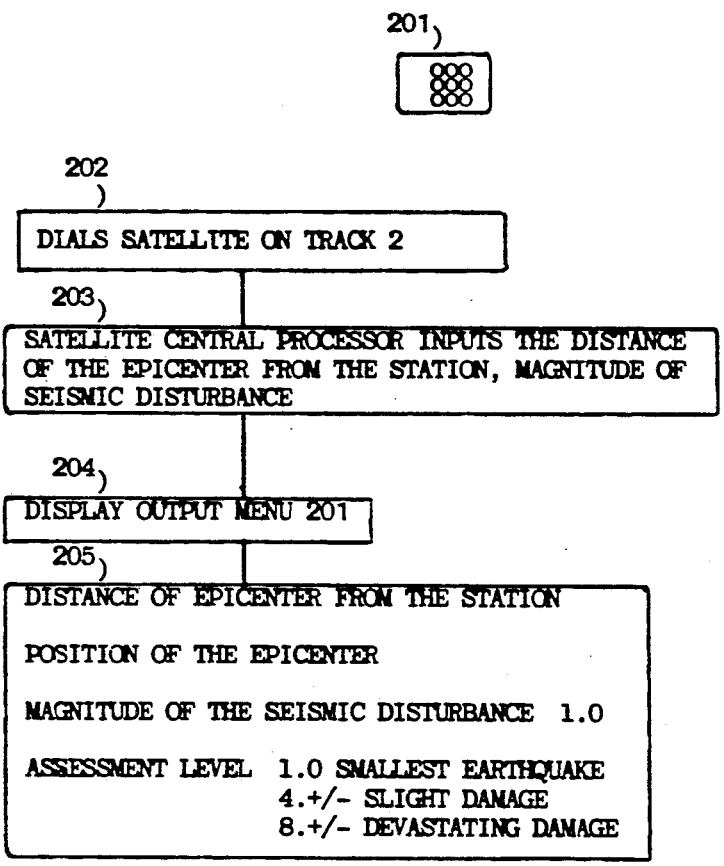
FIG. 30 is a block diagram depicting sample calculations of the seismic disturbances on track 2 of the data disc drum.
Figure 31:
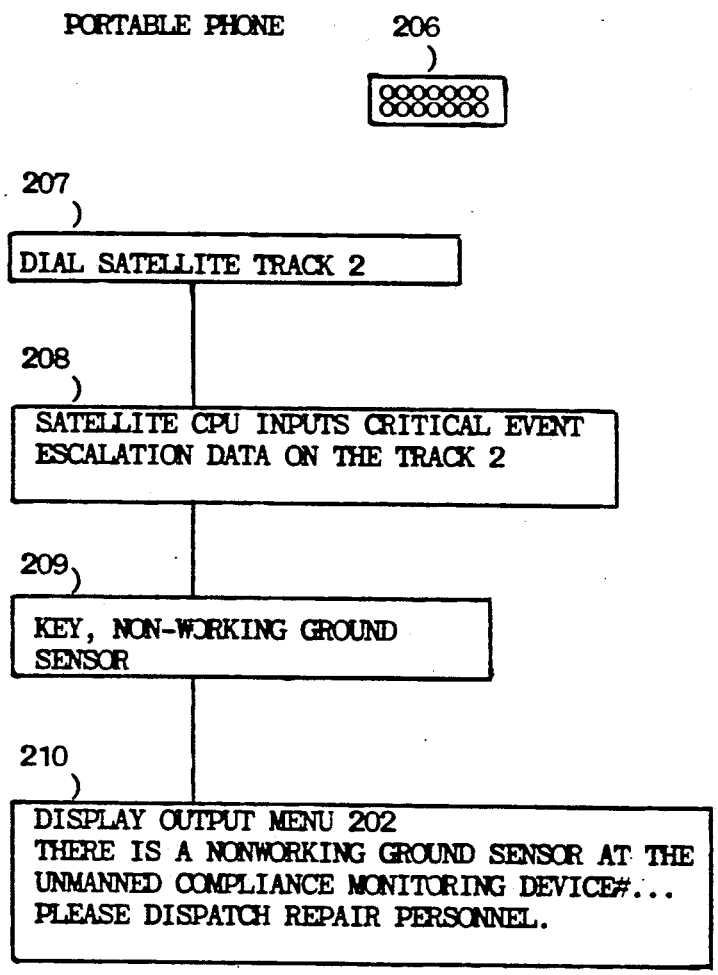
FIG. 31 is a block diagram depicting a sample output menu of the critical event escalation for the unmanned compliance monitoring device. The critical event escalation is accomplished on track 2 of the data disc drum.

| Input variables on track 2 of the data disc drum | |
|---|---|
| | that the seismic detection capability remains intact. There are backup ground sensors in case of breakdowns. |
| nonworking storage device | A nonworking storage device requires maintenance or replacement. Duplicate storage devices are maintained to guarantee continuity of operations. |
| nonoperable photovoltaic solar energy module | This condition requires maintenance so that power generation is continuous. There is an alternate power line for emergencies. |
| timing outage | A timing outage is a nonmatch between the master internal clock and standby or independent clock mechanism offsite from the unmanned compliance monitoring device. |
| Illustrated on FIG. 30 and 31. | |

In FIG. 8, a 53 represents a satellite software interface which receives and processes messages from the portable phone direct dial. A 54 enters earthquake tremors on track 2 of the data disc drum. A 55 enters critical event escalation data on track 2 of the data disc drum. Messages are communicated by the portable phone to facilitate data accumulation and interpretation. The satellite performs a linear programming transportation algorithym to query the nearest unmanned compliance monitoring devices for data-gathering purposes and to accumulate data for the epicenter calculation. The linear programming algorithym for maximum/minimum decomposition linear programming theorems and assignment transportation algorithyms are resident in the arithmetic logic unit of the central processor.

The satellite stores partial segmented messages until accumulating enough data to pass the data format check for segmental message completion. Upon receiving the requisite segmental message completion format, the satellite will perform the epicenter/nuclear test measurement calculation and report results to the governmental agency or designate with appropriate offsite copy to the offsite records facility. A pre-determined protocol is used for all data formatting and the requisite data format checks for completion of segmental data messages are pre-programmed in the satellite software. Parameters for motion detection and dialup to the satellite are preset and validated against preprogrammed minimum observable statistics. The photographic system interfaces with the minimum linear programming decomposition theorem to determine the minimum variances between the observed critical incident locations and the preprogrammed latitudinal/logitudinal parameters. The satellite photos the critical region of the epicenter or nuclear test based upon the linear programming decomposition minimization calculation and by standard input, the results are reported to the offsite remote centers and the appropriate government agency. The satellite software has the capability to interpret data in graphic format (x-y-z) coordinates and using the standard input scheme, communicate the data to a plotter device or menu screen for visual interpretation.

During every nth hour, the satellite queries each unmanned compliance monitoring device sensor to determine its operational status. The standard protocol test is 0-nonworking or 1-operational response. Every nth hour the satellite software queries each internal clock resident within the unmanned compliance monitoring device to verify synchronization at predefined parameters in the satellite software system. Each unmanned compliance monitoring device is assigned an identification number or key along with the devices in the unmanned compliance monitoring device. The device has the capability to be equipped with predefined encryption software modules. A 56 represents the photovoltaic solar energy module and alternate dedicated power line. The photovoltaic solar energy capability is critical to ensure a reliable/independent power source for nuclear test verification. The device is programmed to dialup the satellite when predetermined power fluctuation criteria have been encountered. Such fluctuation results in automatic dialup to the satellite requesting maintenance instructions for the photovoltaic solar energy module. A backup battery-powered pack is used to dialup the satellite. A backup photovoltaic solar energy module is used in standby mode. The protocol for dialing the satellite is a "0" to indicate no power or power below preset parameters.

Upon receipt, the satellite records the event in its critical event monitoring system module and relays the status of power fluctuations to the Atomic Energy Commission or Interior Department. A 57 represents duplicate internal clocks both master and standby which are synchronized to yield identical time readings for event reporting. A 58 represents the master central processor and real time standby central processors. The central processor has at least 2 standby processors, as backup, as well as, matching data storage disks. The central processor accumulates observed statistics from ground sensors. Observations from both ground sensors and underground sensors are accumulated and validated internally. A modular design may be considered in instances where the central processor and dialup software is resident offsite from the unmanned center due to the tremendous forces unleased during earth tremors or nuclear tests. The portable phone or communications device is activated by a tremor registering a preinput parameter or a 0- no activity or 1-reportable activity triggering a dialup to the satellite. A 59 represents motion activators/detection devices which measure the force of tremors/nuclear tests and communicate results to the central processor. A 60 represents an above-ground sensor to detect motion above-ground.

A 61 represents a portable phone which communicates motion activity-tremors, nuclear test movements to the satellite in real time. An internal byte comparison of 0-1 is made to the sensor to determine reportable critical incidents to the satellite. Such incidents are reported by automatic dialup from the unmanned compliance monitoring device. The satellite performs a linear programming transportation algorithym to determine the nearest unmanned compliance monitoring devices 1, 2, . . . n. When this determination has been made, the satellite makes an inquiry as to the activity. If there is no activity, the incident is reported as a predetermined segmental message whose status is incomplete. If n or n+1 unmanned compliance monitoring devices in close proximity have recorded activity, the satellite will receive the observed statistics and link them to the initial segmented message to create a completed message. Upon completing the message, the satellite system calculates the epicenter for the tremor or nuclear test result. A 62 is the cylinderical encasement surrounding the sensing rods. The encasement is designed to withstand earth tremors or nuclear tests calibrated to the Richter scale or similarly objective measurement.

All internal moving parts and automatic systems are designed to operate successfully in a test mode. The device comprises materials to conform to heat/cold temperature tolerance levels and withstand geological tolerances to preclude damage by wind, water, soil erosion or corrosion. The device is easily accessible by maintenance engineering personnel with key internally moving parts clearly labelled by "pointer arrows" or simple scientific verbiage. The device has clearly defined override capability and reporting of the overrides to senior management or the appropriate governmental agency. A 63 represents underground sensors piledriven to predetermined lengths. These sensors communicate to the internal central processor. The central processor compares the observed statistics to the internal logic and at the predetermined threshold, an automatic dialup is made to the satellite. Each underground sensor has motion detection capability and limited intelligence/computer validation capability to compare predefined critical events to the master central processor and standbys. An on/off protocol of 0–1 message is sent by the sensors to the central processor to indicate a reportable or nonreportable incident for satellite transmission by automatic dialup. A "1" protocol will trigger the automatic dialup capability.

The file layout consists of key, bit test 0 or 1, force measurement by the Richter logarithymic protocol, critical factor high/low, segmental message protocol, completed message protocol, event status, satellite answerback response, date, time, central processor sending protocol, satellite answerback. A 64 represents an alternate dedicated power line below the surface which acts in a standby mode.

Figure 9:
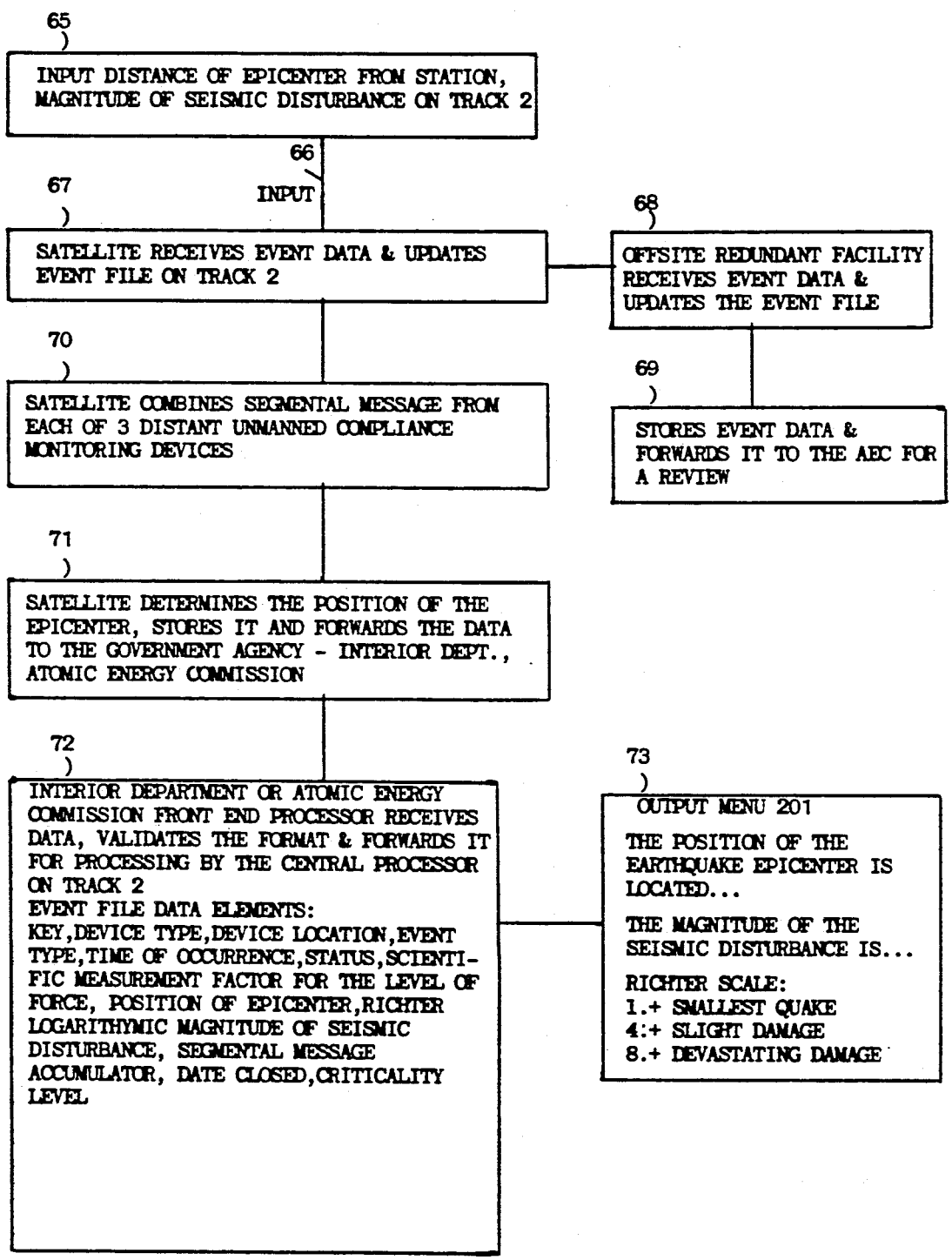
FIG. 9 is a block diagram depicting processing of the earthquake measurement data and the event file on track 2 of the data disc drum.

FIG. 9 is a block diagram depicting event status elements of data transmitted from the unmanned complicance monitoring device to the satellite and offsite redundant facilitities. In FIG. 9, a 65 represents event data received by the satellite in order to update the event files. A 66 represents data entered onto the satellite for processing. A 67 represents the satellite receipt of data and update of the event file on track 2 of the data disc drum. A 68 represents duplicate data transmitted from the device to the offsite redundant facility so that a duplicate transmission can be replicated in case the satellite software is inoperable. A 69 stores event data at the offsite redundant facility in queue and forwards it to the Atomic Energy Commission. A 70 shows the satellite combining segmental messages from each of 3 distant unmanned compliance monitoring devices.

A 71 represents the satellite calculation of the epicenter and forwarding the data to the appropriate governmental agency.

A 72 is the front-end processor (FEP) at the Atomic Energy Commission or governmental agency. The front end processor receives data transmissions from the offsite redundant facility or the satellite and processes the critical events. Critical events are earthquake tremors, nuclear tests, primary or secondary waves or nonoperating equipment conditions. A 73 displays the epicenter calculation and seismic measurement.

Figure 10:
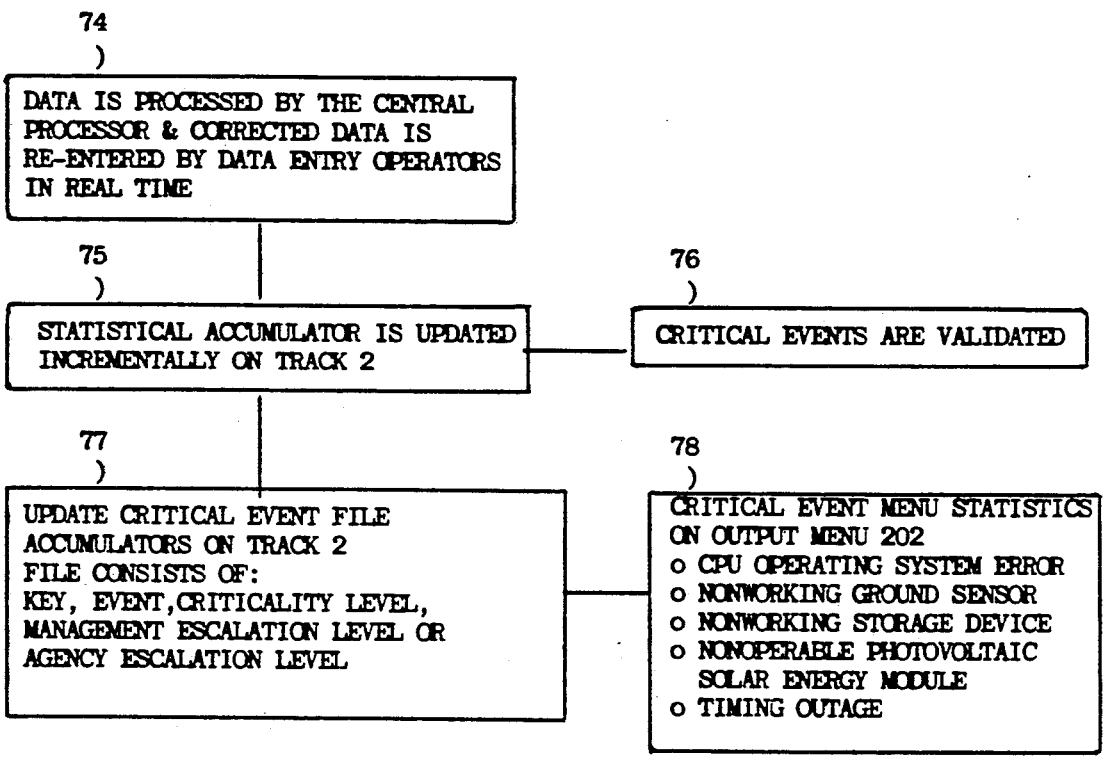
FIG. 10 is a block diagram depicting the processing of the unmanned compliance monitoring device critical event file and display of the results on the output menu.

FIG. 10 is a block diagram depicting processing of the event data at the Atomic Energy Commission or governmental agency.

In FIG. 10, a 74 continues processing event data, reformats incorrect data and enters once again—the data enroute. A 75 accumulates a statistical file on event history. A 76 tests individual event against a preinput critical event validation formula. A 77 updates the critical event statistical file. A 78 displays the critical event menu of various non-operating conditions at the unmanned compliance monitoring device.

Figure 11:
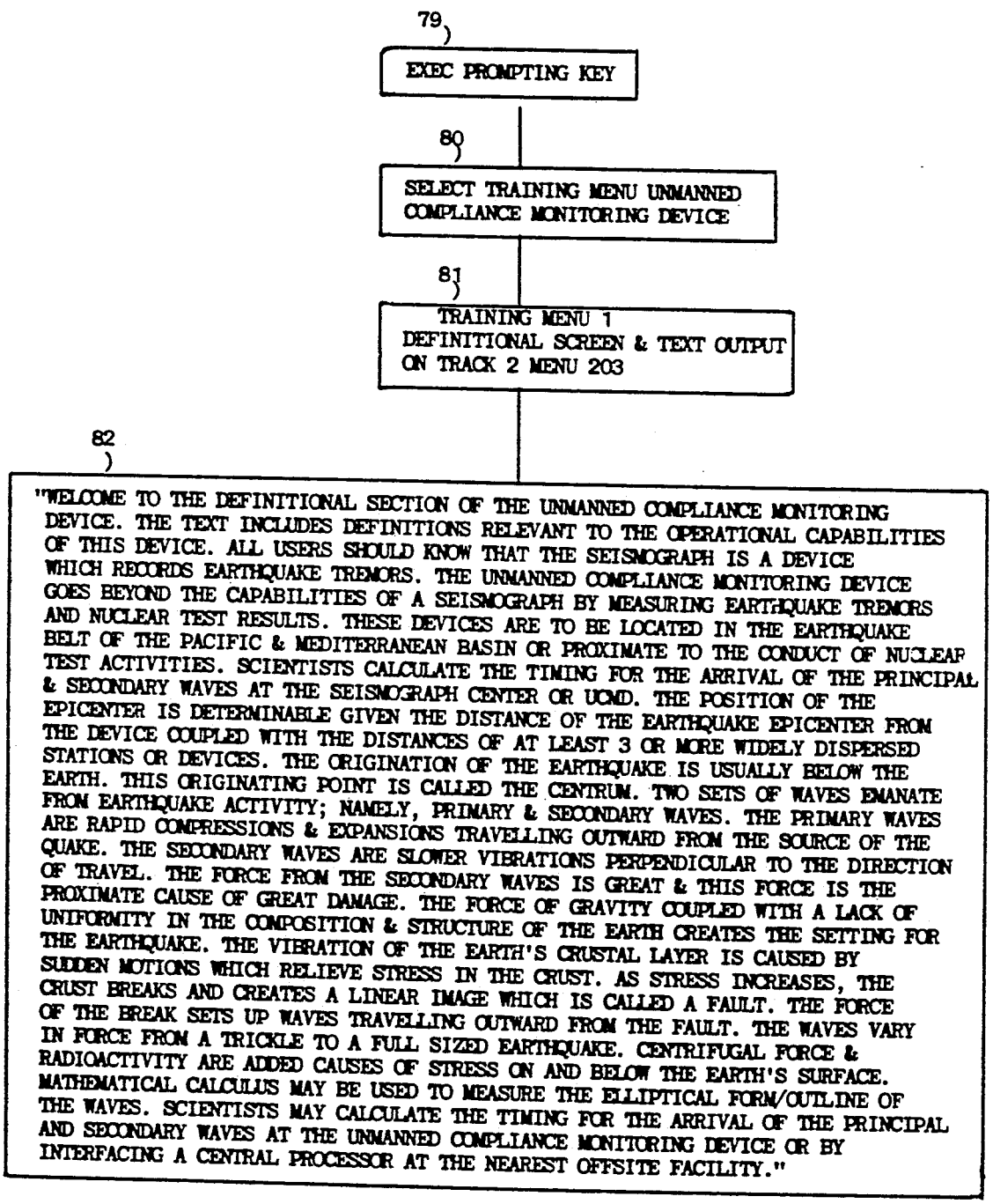
FIG. 11 is a block diagram depicting the processing of the unmanned compliance monitoring device training menu on track 2 of the data disc drum.

FIG. 11 is a block diagram depicting a training menu of key definitions relative to nuclear test measurements and earthquake tremor measurements.

In FIG. 11, a 79 is an exec prompter. An 80 is the training menu selection key. An 81 is the training menu text. An 82 is the actual training menu text which explains key scientific data for earthquake and nuclear test measurements.

Figure 12:
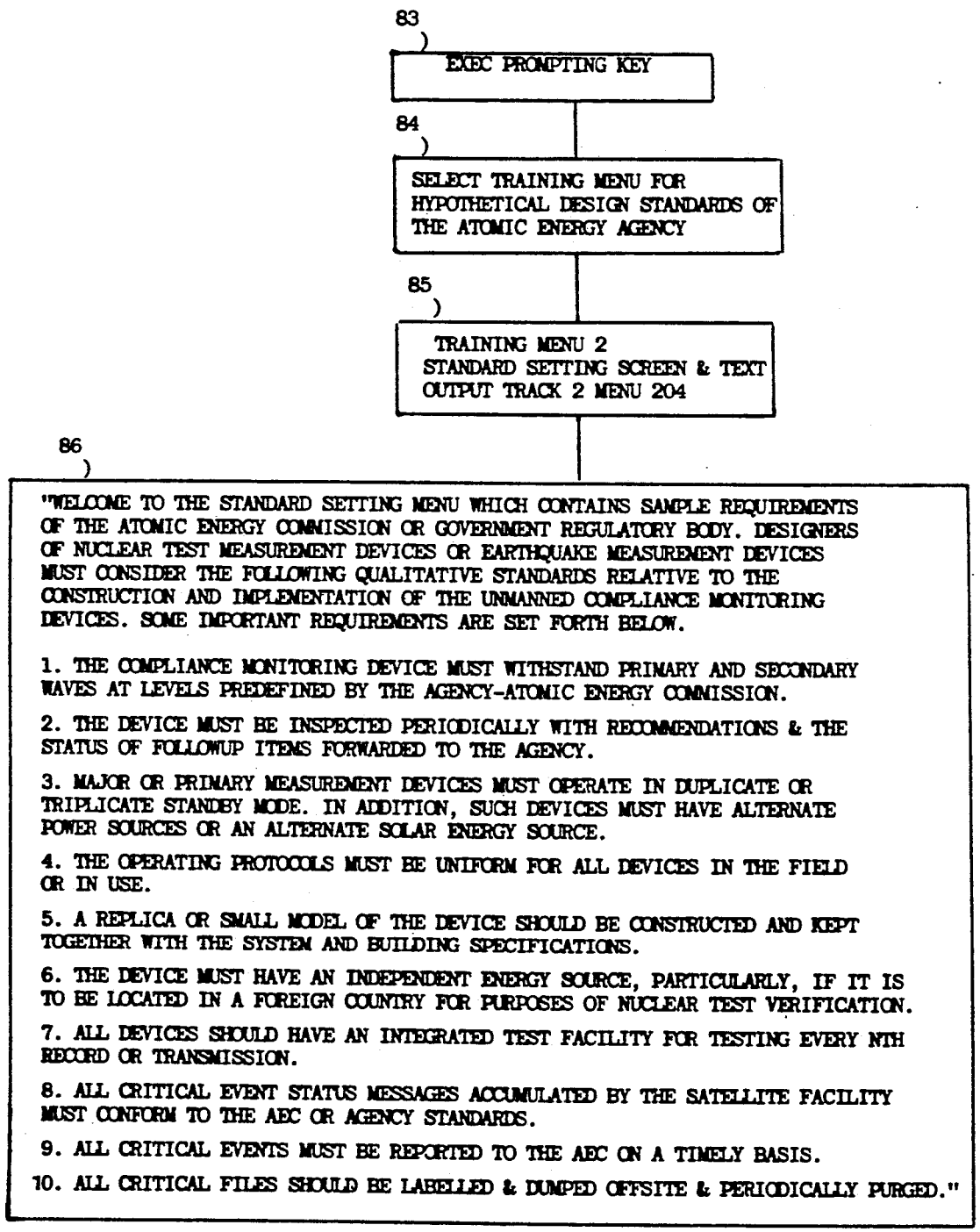
FIG. 12 is a block diagram depicting a hypothetical standardsetting training menu for the unmanned compliance monitoring device users. The training menu is on track 2 of the data disc drum.

FIG. 12 is a block diagram depicting hypothetical design standards of the Atomic Energy Commission. In FIG. 12, an 83 is the prompter key. An 84 is the selection key for the training menu. 85 is the standard-setting screen. An 86 is the text displayed on the terminal screen. The text contains sample standards of the Atomic Energy Commission.

Figure 13:
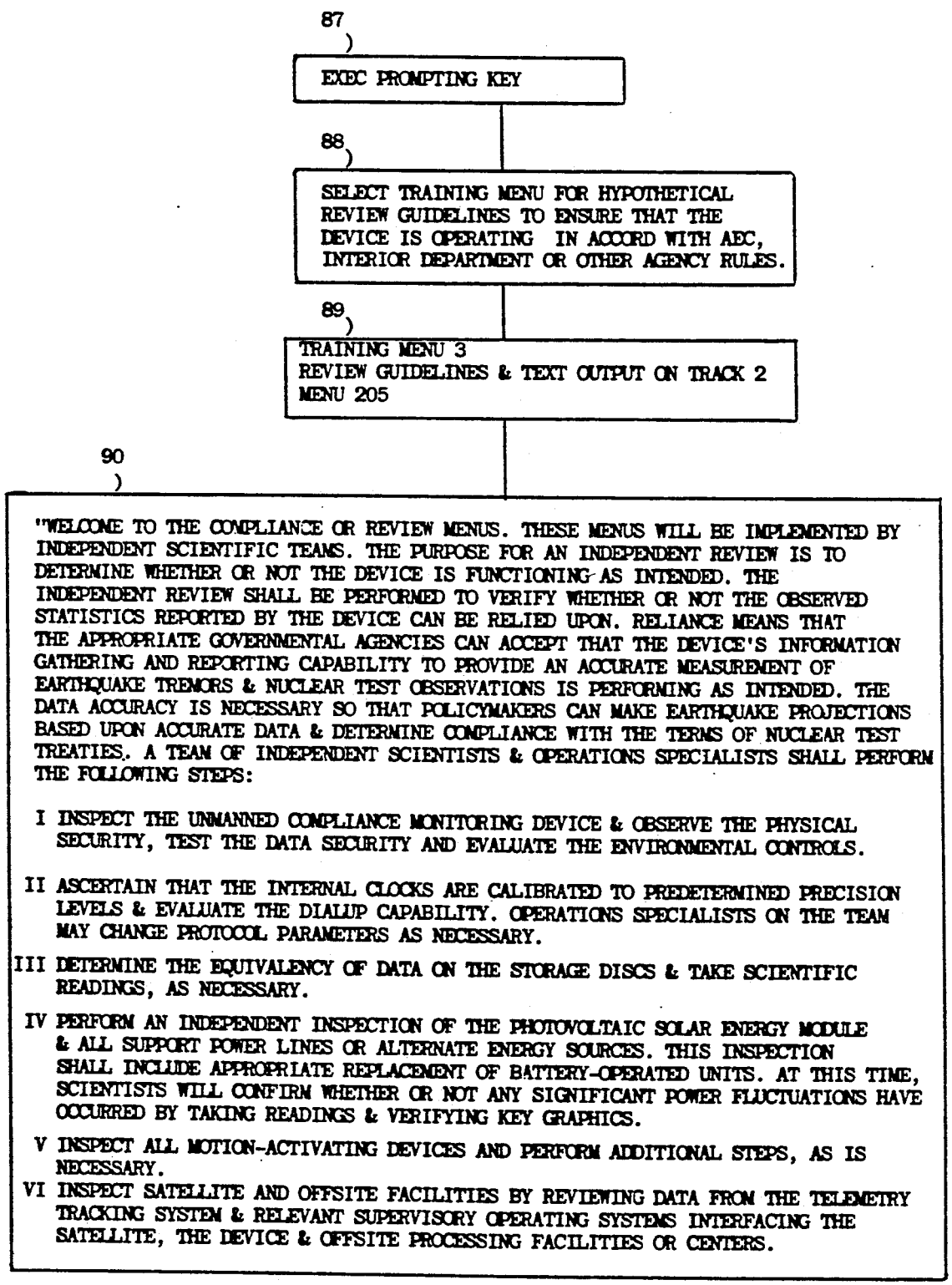
FIG. 13 is a block diagram depicting sample review guidelines for the unmanned compliance monitoring device. The review guidelines are on track 2 of the data disc drum.

FIG. 13 is a block diagram depicting review guidelines for the unmanned compliance monitoring device. In FIG. 13, an 87 is the exec prompter key. 88 is the training menu containing review hypothetical procedures of the Atomic Energy Commission or similar government entity. An 89 contains the text of the review guidelines. A 90 displays the text of hypothetical review guidelines set forth by the Atomic Energy Commission.

These typical review procedures will be performed by teams of scientists sent out to verify that the unmanned compliance measurement device is operating.

Figure 14:
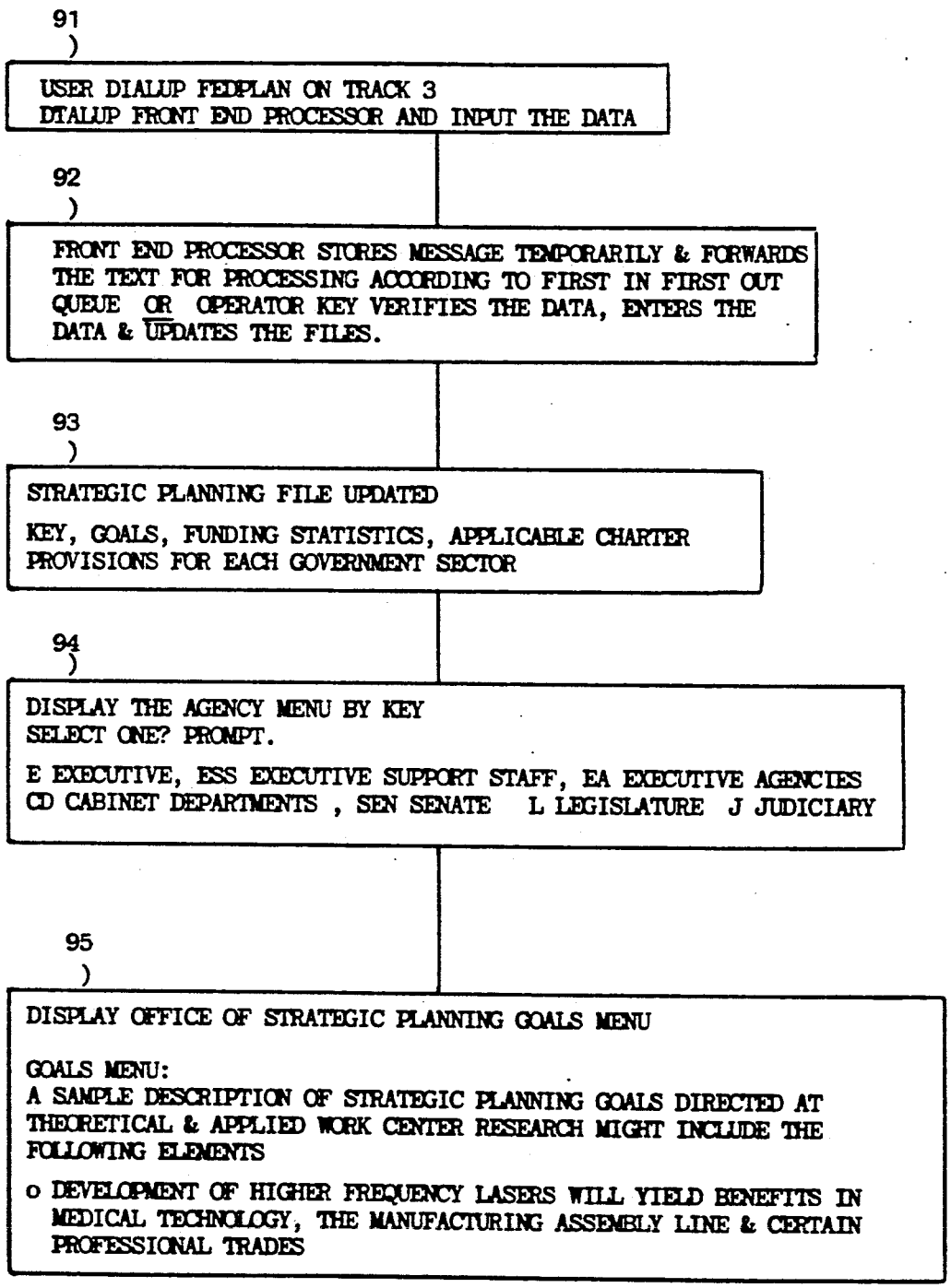
FIG. 14 is a block diagram depicting the federal planning inputs on track 3 of the data disc drum.
Figure 32:
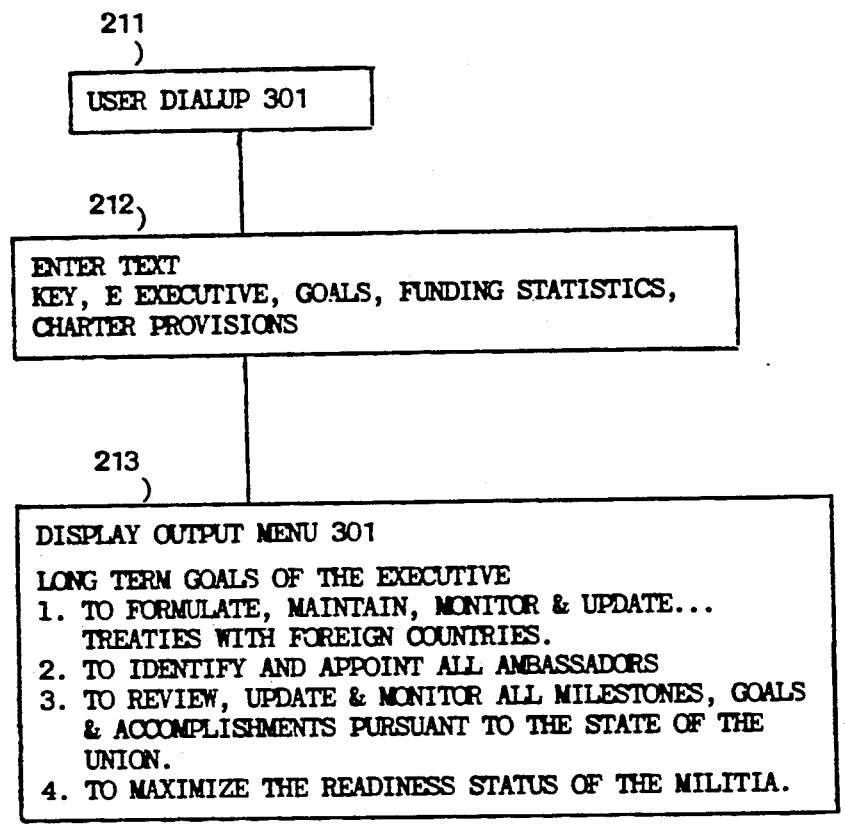
FIG. 32 is a block diagram depicting sample output of the FEDPLAN on track 3 of the data disc drum.

FIG. 14 is a block diagram which depicts the system modular design for aggregating strategic planning data. In FIG. 14, the input variables are defined below:

| Input variables on track 3 of the data disc drum | |
|---|---|
| Goals | the individual goals of the governmental entity are input by the user. |
| Funding Statistics | the relevant budget data is input by the user. This data includes sources and uses of funds, budgeted & actual amounts. |
| Applicable charter provisions | the applicable organizational charter provisions are input by the user. The charter provisions define the organization and the manner in which goals are carried out. |
| An Illustration is on FIG. 32. | |

In FIG. 14, a 91 enters planning data onto track 3 of the data disc drum. 92 is the store/forward capability for queuing text message transmissions prior to operator processing or central processor unit processing. A 93 defines the data elements in the planning file. A 94 displays the governmental agency menu. A 95 displays a sample goals menu.

Figure 15:
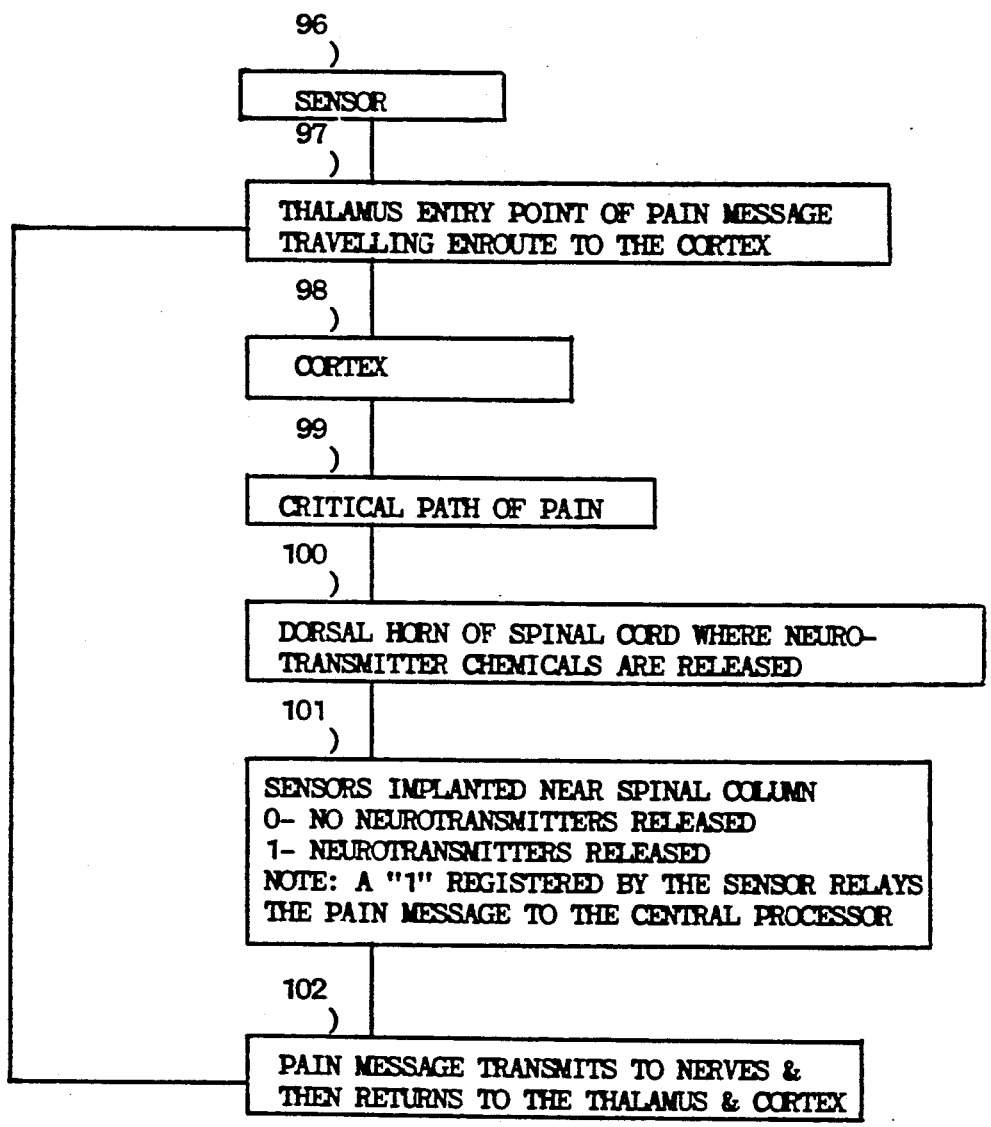
FIG. 15 is a block diagram depicting the critical path of pain from the thalamus to the cortex and measurement sensors which indicate whether or not neurotransmitters have been released. The neurotransmitters replay pain signals within the brain.

FIG. 15 is a block diagram which depicts a pain identification and diagnostic monitoring system. The author describes mechanisms for detecting pain; however, the detailed surgical implantation procedures to implant the sensing devices are not covered by the author. These detailed surgical procedures must be considered as separate technical issues on a case by case basis with due consideration to applicable medical practice standards. The system detects pain messages at the principal juncture points of the thalamus and the spinal cord. In FIG. 15, the inputs are defined below.

| Input variables or conditions Binary sensor device | |
|---|---|
| Switch 0 | no neurotransmitter chemicals released and no pain message relayed to track 4 of the data disc drum |
| Switch 1 | neurotransmitter chemicals released and event reported as pain message on track 4. |
| An Illustration is on FIG. 33. | |

FIG. 15, a 96 represents pain sensing devices implanted near the thalamus. The pain sensing devices may be biologically or mechanically engineered for implantation. A 97 represents the thalamus—a juncture point whereupon pain messages enter the brain. A 98 shows the pain message travelling to the cortex. A 99 represents the diagnostic system calculation of the critical path of pain by use of the linear programming decompositon theorem-critical path method. A 100 represents the dorsal horn of the spinal cord where neurotransmitter chemicals are released. When these chemicals are released a "1" is registered by the sensor and the pain message is transmitted to the central processor. A 101 represents sensors near the spinal column which detect pain messages by the neurotransmitter chemicals released. A 102 relays the pain message back to the thalamus and cortex.

Figure 16:
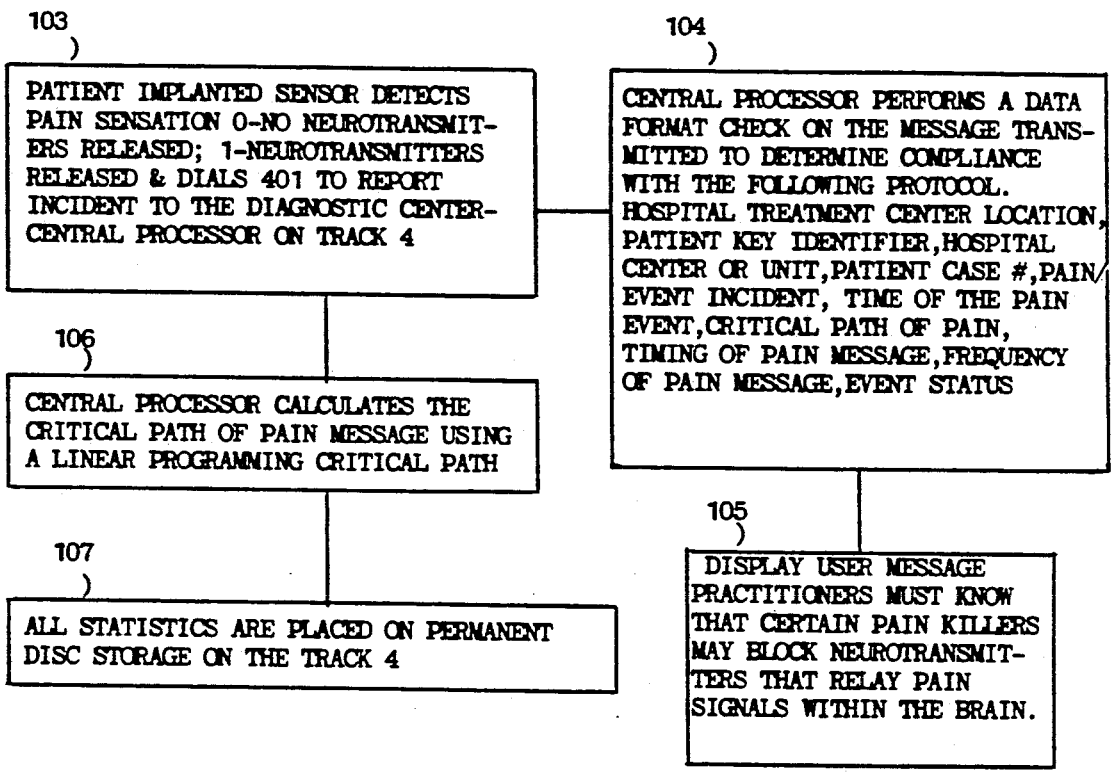
FIG. 16 is block diagram depicting the measurement and display of pain messages on track 4 of the data disc drum.

FIG. 16 is a block diagram depicting the diagnostic system data elements and design to measure and monitor bodily pain sensations. In FIG. 16, the input variables employed are listed below.

| Input variables on track 4 of the data disc drum | |
|---|---|
| Binary sensor device | |
| Switch 0 | previously defined |
| Switch 1 | previously defined |
| Hospital Treatment Center | location of treatment center for patient |
| Patient key identifier | e.g. social security # |
| Hospital Center/Unit | hospital section where the patient is assigned |
| Patient case number | numerical sequence assigned for "display purposes" to protect patient privacy |
| Pain incident | pain event which results in binary switch 1 & report of the incident to the diagnostic center |
| Time of pain incident | exact time of pain event |
| Critical path of pain | route travelled by pain sensation or message |
| Timing of pain message | period of day or cycle of pain message |
| Frequency of pain message | cycle of pain events & the number of occurrences per cycle |
| Event status | open, resolved |
| Linear programming critical path Algorithym | The algorithym calculates the length of the pain message based on its critical path & variability. According to the central limit theorem of statistics, the variability associated with any path through the network, including the critical path, can be approximated by a normal distribution. The system calculates the time each pain incident is critical. This is called the critical index & measures the likelihood that pain will be critical. |

In FIG. 16, a 103 represents a pain sensor detecting the critical event and transmitting it to the diagnostic central processor. A 104 represents a data format check prior to the processing. A 105 displays a user message on the system.

A 106 represents a calculation of the critical path of pain by the critical path method. A 107 represents permanent storage of the calculated "critical path" measurement data.

Figure 17:
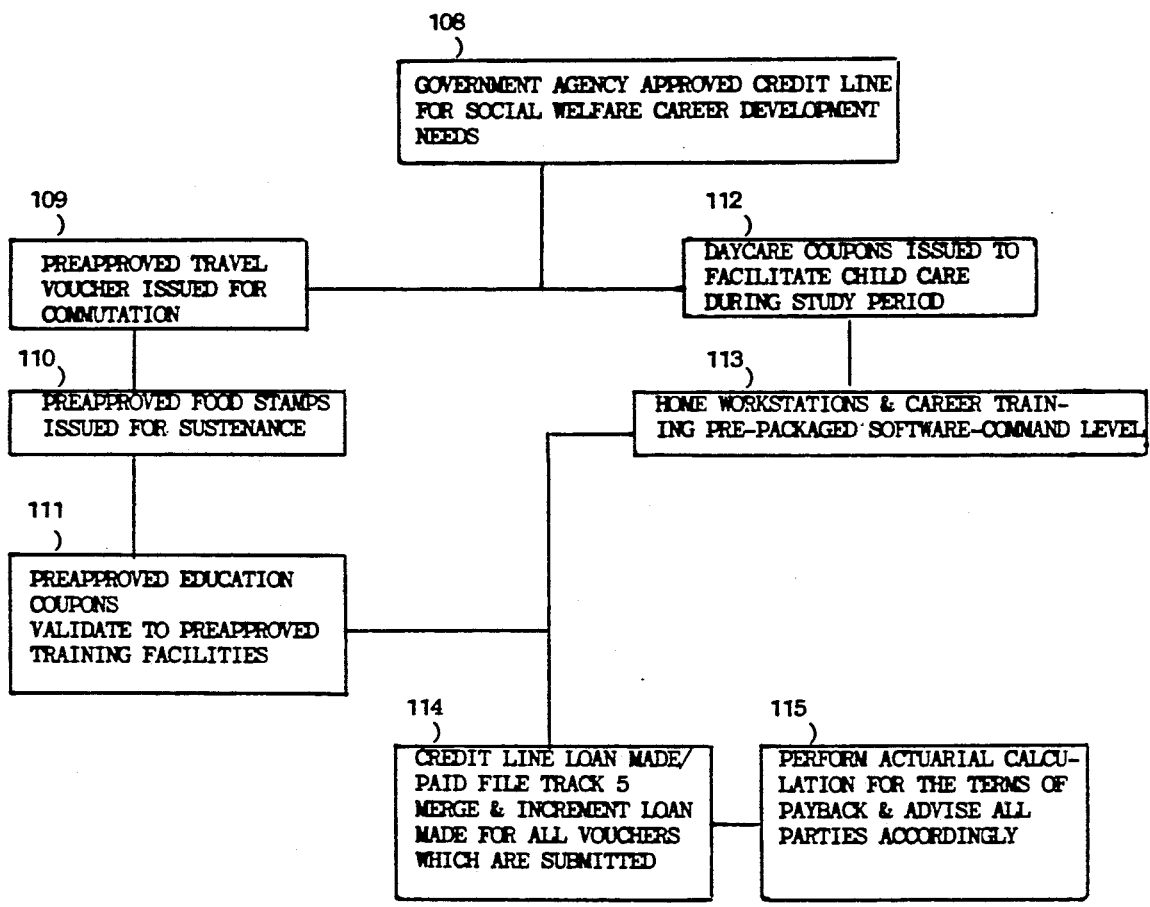
FIG. 17 is a block diagram depicting career development factors for social welfare recipients. The subsystem results in a loan credit made to individual applicants and interested parties.

FIG. 17 is a block diagram depicting a social welfare career development system module which tracks career development needs of social welfare recipients through the developmental cycle leading to permanent career positions and apprenticeships in skilled trades and various professional job categories. The system provides welfare recipients the opportunity to prepare for a career/profession at homeworkstations while continuing on the welfare program. The system is designed to augment the home learning experience with supplemental daycare, food stamps, education coupons and travel vouchers. Participants pay back the initial career investment in accordance with their ability to repay—as evidenced by the attained income schedule. The program may be supplemented by granting permanent tax holidays in the early years to provide welfare recipients with the opportunity to develop an equity base. In FIG. 17, a 108 represents a governmental agency approved credit for a pre-approved career development option. A 109 represents a pre-authorized travel voucher(s). A 110 represents supplementary food stamps. A 111 represents education coupons (good as cash) for use at virtually all government-approved facilities. A 112 represents pre-approved daycare coupons.

A 113 represents an allowance for purchasing/leasing home workstations and pre-packaged software (inclusive of dedicated leased lines). The software is to comply with a user-friendly command-level conversational protocol. A 114 represents the total credit line amount. A 115 represents the actuarial calculation to determine payback. The primary payback benefit cannot be measured in money; namely, the joy of providing welfare recipients with an increasingly remunerative career tailored to individual needs. Secondarily, the government recovers its initial investment when the welfare recipient pays incremental portions of the loan while contributing tax dollars to the government treasury. In addition, the aggregate national productivity may improve due to more and better-trained persons entering the workforce. State and municipal budgets may be impacted positively, as more resources can be made available for other purposes; such as, housing or infrastructure improvements.

FIG. 18 is a block diagram which depicts a planning and implementation menu. In FIG. 18, the following variables are employed in the system processing.

| Input variables on track 5 of the data disc drum | |
|---|---|
| Approved credit loan | Approved credit available to |

-continued

| Input variables on track 5 of the data disc drum | |
|---|---|
| Accumulated vouchers | the applicant<br>Total purchases of services made by the applicant reducing the available credit pool of funds |
| Total loans made | Total loans made to the applicant |
| Accumulated payments made to date | The sum of all payments made to date on applicant's account |
| Illustrated on FIG. 34. | |

In FIG. 18, a 116 represents the user prompt of the social welfare-career development system module. A 117 represents the background explanatory text describing the program benefits. A 118 represents the government strategic planning goals requisite to implementing the career development system. The detailed computer file design is listed and input variables are explained. A 119 is the implementation menu.

Figure 19:
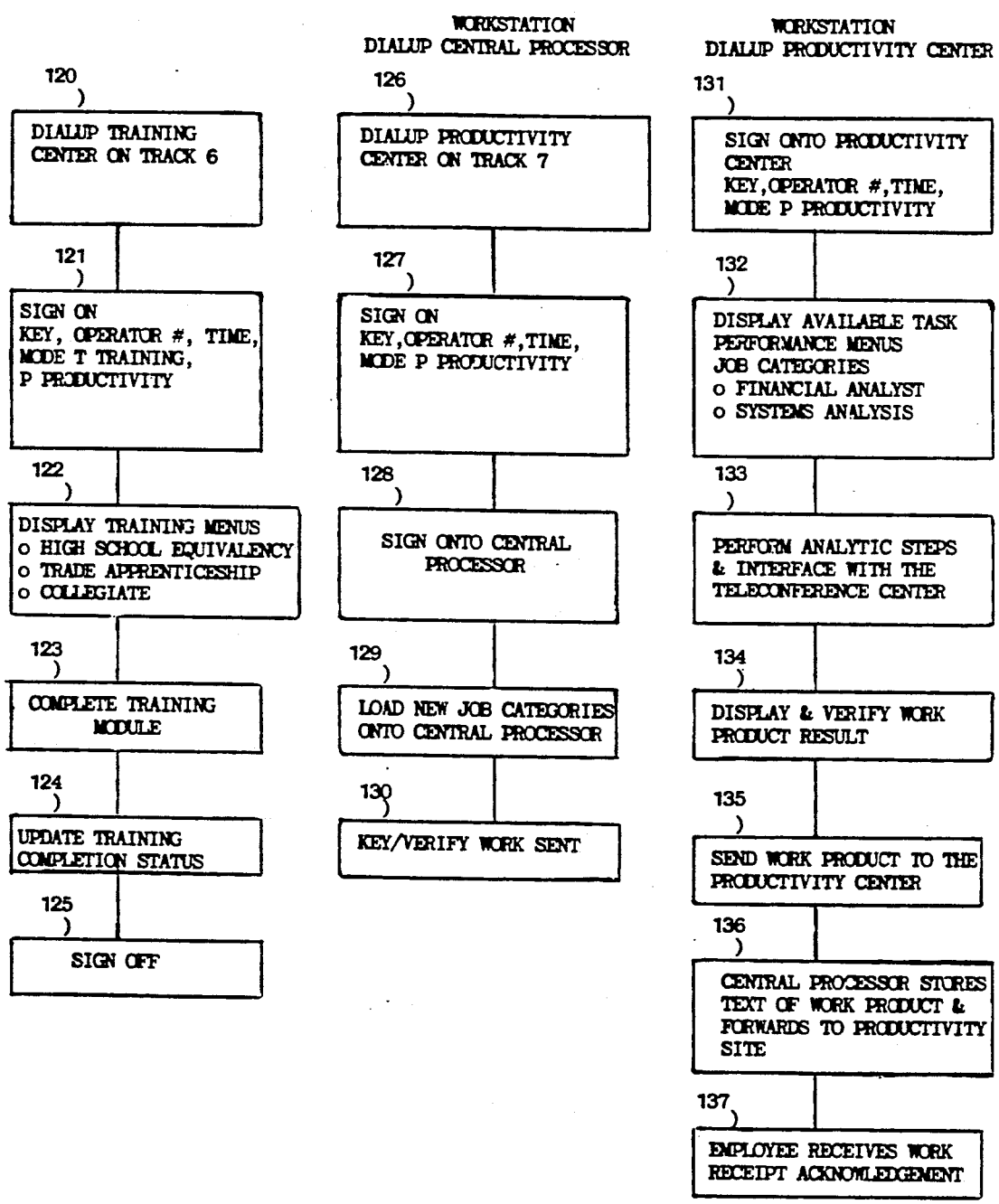
FIG. 19 is a block diagram depicting worker commands to the training and productivity modules on tracks 6 and 7 of the data disc drum.

FIG. 19 is a block diagram which depicts the workstation design interfacing the worker with the workcenter. The design is applicable to work at home and train at home scenarios. The design is most advantageous since some welfare recipients would benefit from the work at home schedule thereby reducing the need for daycare facilities, travel and various incidental expenses.

Figure 35:
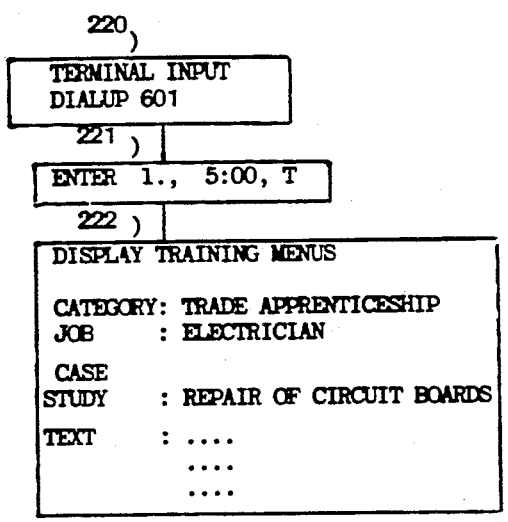
FIG. 35 is a block diagram depicting a sample training menu on track 6 of the data disc drum.
Figure 36:
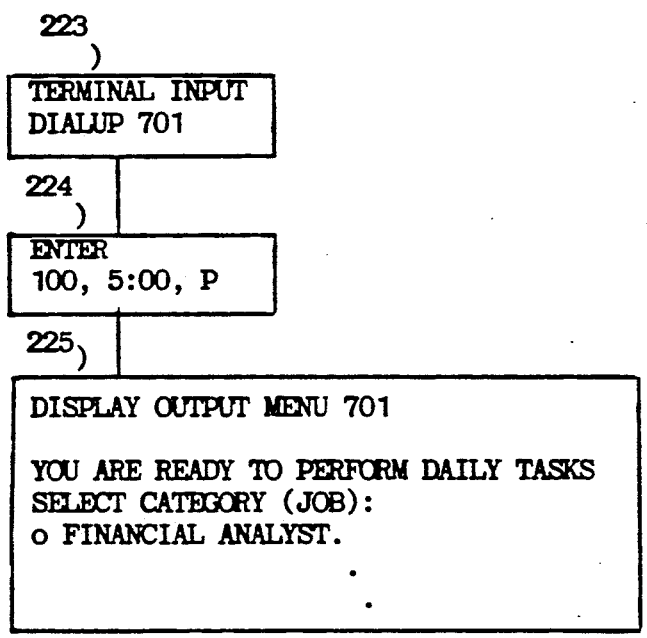
FIG. 36 is a block diagram depicting a sample productivity menu on track 7 of the data disc drum.

| Input variables on track 6 and 7 of the data disc drum | |
|---|---|
| Operator number | operator/employee number |
| Time | time of sign on |
| Mode T- training | the system operates in training mode |
| Mode P- productivity | system operating in productivity mode |
| Illustrations are on FIG. 35 and 36. | |

In FIG. 19, a 120 represents a workstation interface with the central processor and sign on. A 121 represents a dialup training mode. A 122 represents the training options available. A 123 represents the completion of training. A 124 updates the training schedule. A 125 is a sign-off. A 126 represents vendor or the program in charge dialup of the productivity center by the appropriate governmental agency.

A 127 represents the operator sign on. A 128 represents the operator interface with the central processor. A 129 represents loading new job categories onto the central processor. A 130 represents a key-verification of work sent to the productivity center. A 131 represents the worker dialup of the productivity center. A 132 displays available task performance menus and available work-at-home job categories. A 133 does detailed worker interfacings with the system and teleconferencing, as necessary. A 134 displays and verifies the final work product menus. A 135 sends the final work product to the productivity center. A 136 stores the work product text at the productivity site. A 137 is the productivity center answerback acknowledging receipt of the final work product.

Figure 20:
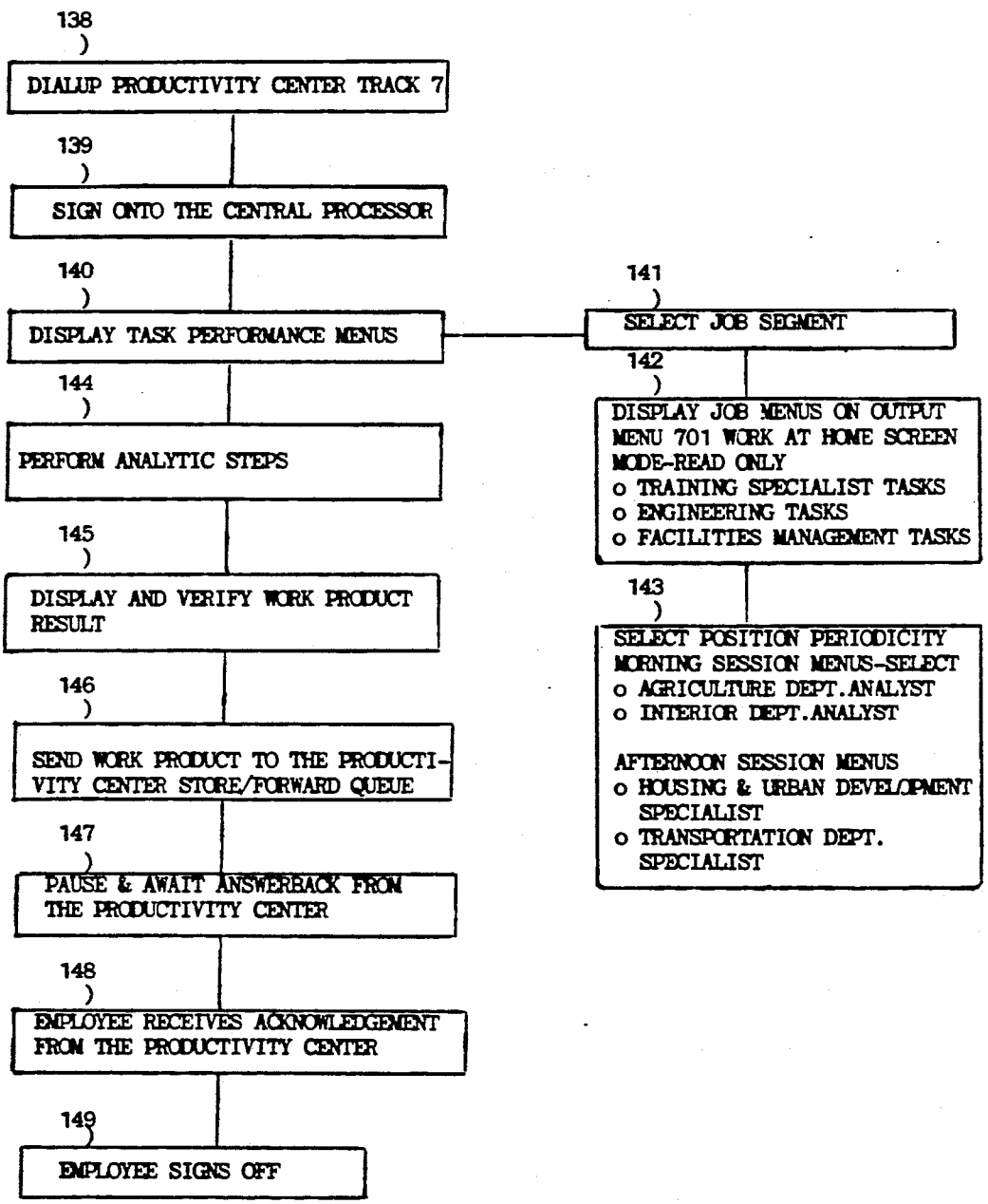
FIG. 20 is a block diagram depicting job segmentation on track 7 of the data disc drum.

FIG. 20 is a block diagram which depicts the flexible task performance design allowing workers a variable job selection from their home workstations. In FIG. 20, a 138 represents a dialup protocol to the productivity center. A 139 is a standard sign-on protocol to the central processor. A 140 displays task performance menus. A 141 selects the individual job segments. A 142 displays the job selection from a task inventory of open requisitions. A 143 divides the productivity period into 2 sessions—morning and afternoon. This customized menu allows the employee to function in at least 2 different departments or categories including variable job levels. For instance, an employee can function in an entry level position in the morning and a senior level position in the afternoon. A 144 represents the individual analytic work steps performed by the employee. A 145 displays and verifies the work product. A 146 sends the work product to a productivity center and stores the result in queue or waiting line. A 147 represents a pause awaiting an answerback from the productivity center. A 148 represents a productivity center answerback. A 149 represents an employee sign-off.

Figure 21:
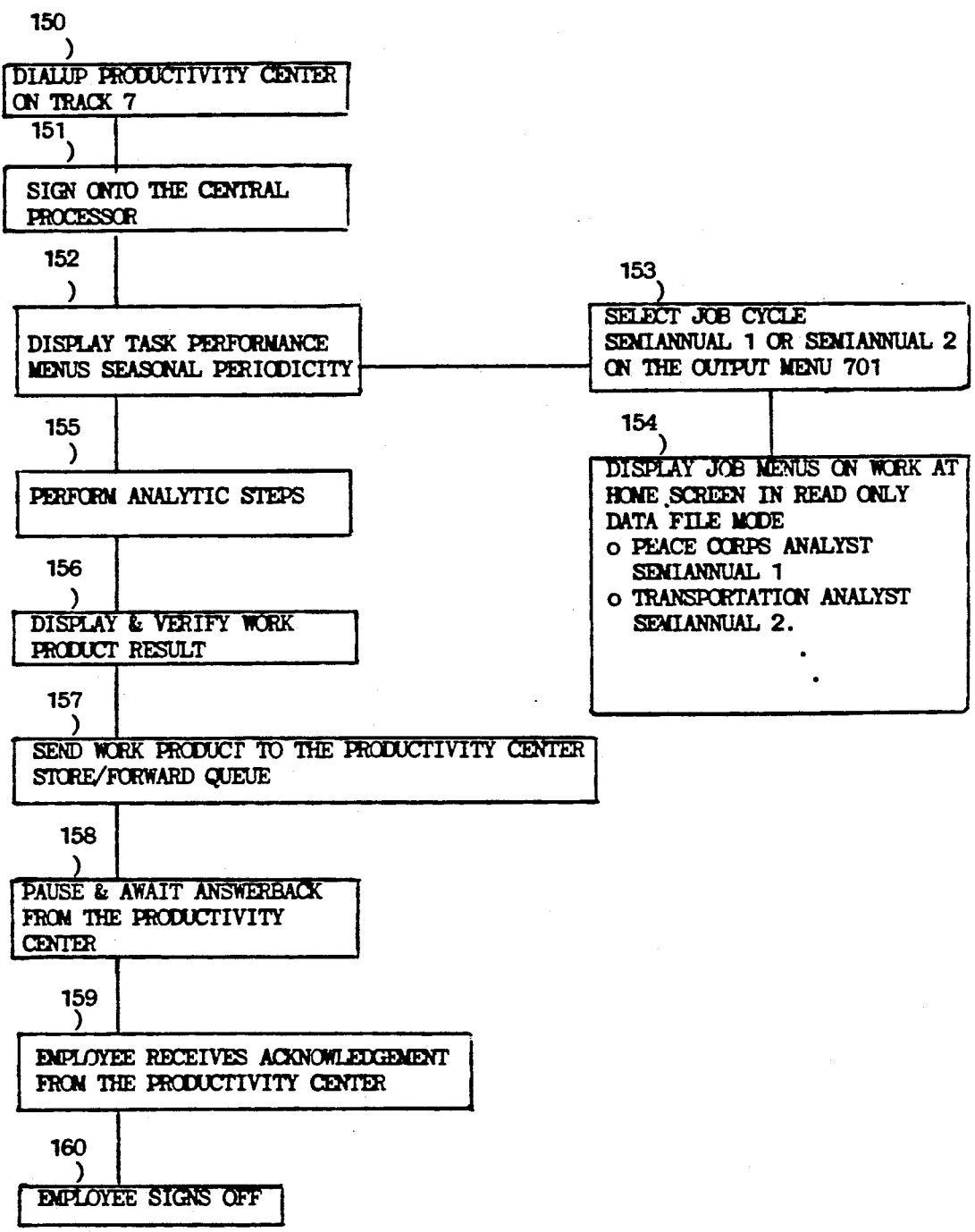
FIG. 21 is block diagram depicting sample job cycles and productivity menus on track 7 of the data disc drum.

FIG. 21 is a block diagram which depicts a flexible work at home design for government workers. In FIG. 21, a 150 represents a dialup to the productivity center on track 7. A 151 represents a sign onto the central processor. A 152 displays task performance menus giving a seasonal periodicity. A 153 selects the job cycle on a semi-annual or calendar periodic basis. A 154 displays individual job menus by calendar period. i.e. semi-annual A 155 performs detailed analytic work steps. A 156 displays and verifies the work product. A 157 sends the work product to the productivity center store/forward queue. A 158 pauses and awaits an answerback from the productivity center. A 159 represents an employee acknowledgement from the productivity center. A 160 represents an employee sign-off.

FIG. 22 is a block diagram depicting a flexible municipal solar energy problem detection capability and statistical data accumulation for all utility poles in a predefined geographical area. In FIG. 22, the following variables are employed in the system processing.

Figure 37:
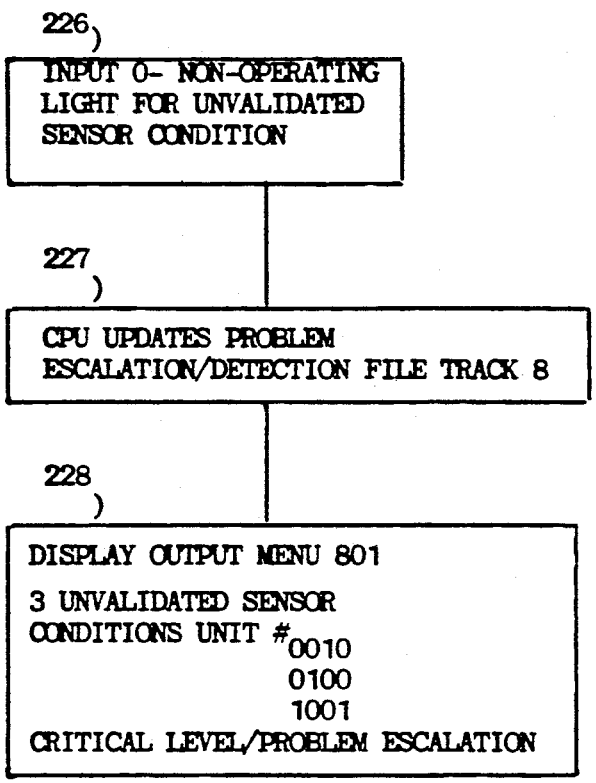
FIG. 37 is a block diagram depicting a solar energy problem detection file on track 8 of the data disc drum.

| Input variables on track 8 of the data disc drum | |
|---|---|
| "0" answerback | the central processor queries the utility pole and discovers a "0" answerback or non-operable condition. Such condition is reported on the solar energy utility statistical menu on track 8 of the data disc drum. |
| "1" answerback | the central processor unit queries the utility pole and discovers a "1" answerback or operable condition. |
| Location of subsystem | the solar energy utility company problem detection system pinpoints the location of the non-working utility pole. |
| Escalation level | the solar energy utility company problem detection system ranks the problem by level of importance |
| Date opened/closure | Date problem discovered & or resolved. |
| An Illustration of the mechanism is on FIG. 37. | |

In FIG. 22, a 161 represents a detailed background menu explaining the system utility. A 162 is the central processor query of the individual utility poles in the system.

A 163 tests each answerback according to criteria; a "0" answerback is a non-operable status and a "1" answerback is an operable status. A 164 represents the solar energy problem detection menu which queries all utility poles and escalates non-working conditions. A 165 is a detailed statistical report capability giving individual status updates on problem items.

Figure 23:
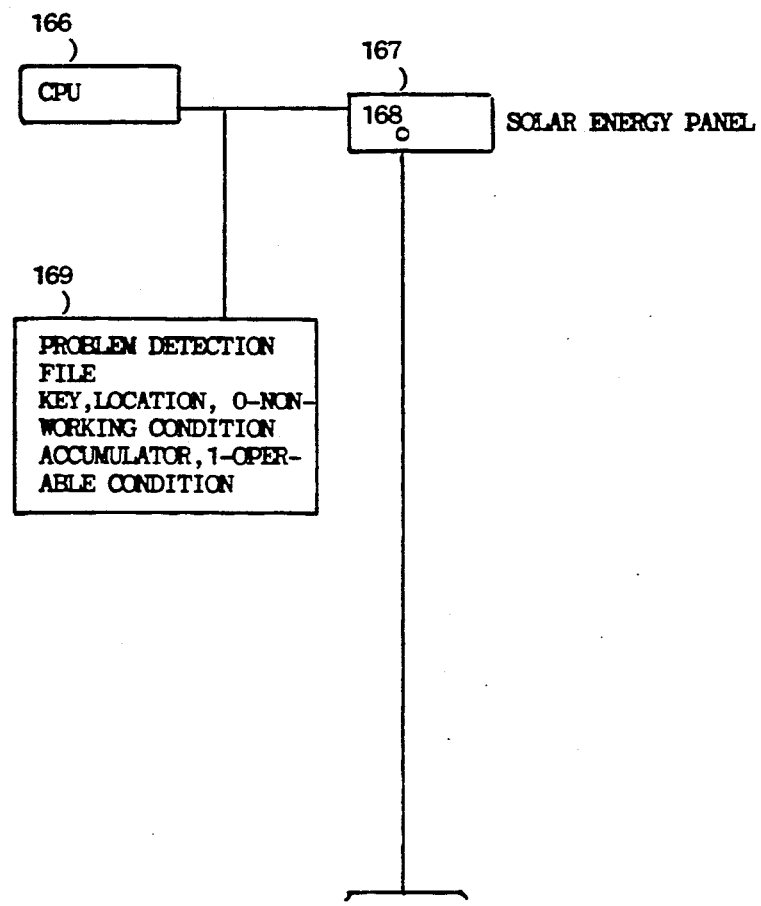
FIG. 23 is a block diagram depicting the interface between the solar energy panel, central processor and problem detection file.

FIG. 23 is a block diagram which depicts the system design of the problem detection sensor. In FIG. 23, a 166 represents a central processor query of all utility poles in a predefined geographical region. The inquiry may be made by satellite interface or dialup to a local offsite central processor. A 167 represents the sensor which tests for a predefined light intensity. A 168 represents the individual solar energy panel which recharges the system during the day. A 169 is an update of the problem detection file.

Figure 24:
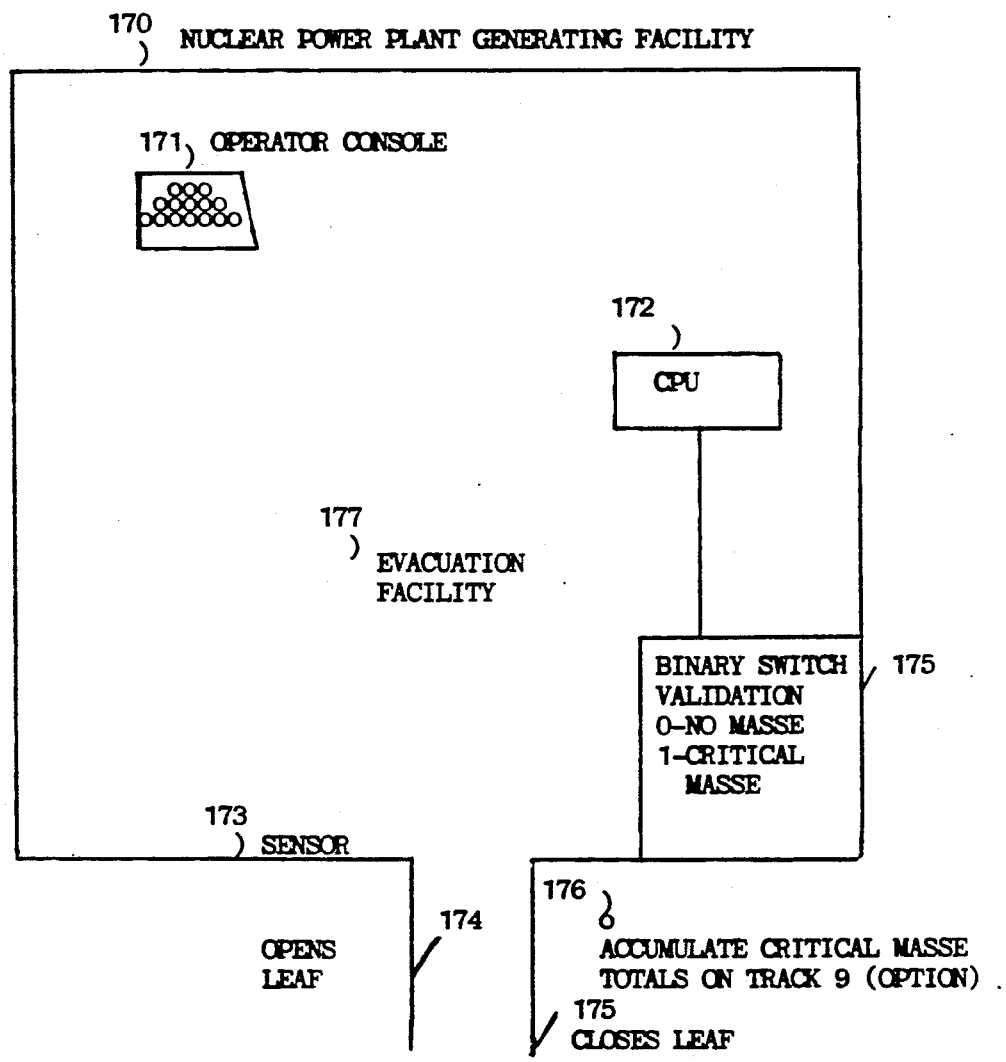
FIG. 24 is a block diagram depicting the binary data organization for detection of excess nuclear waste volume in the facility encasement.

FIG. 24 is a block diagram which depicts a system capable of detecting the critical masse of nuclear waste prior to evacuation into outer space.

Figure 38:
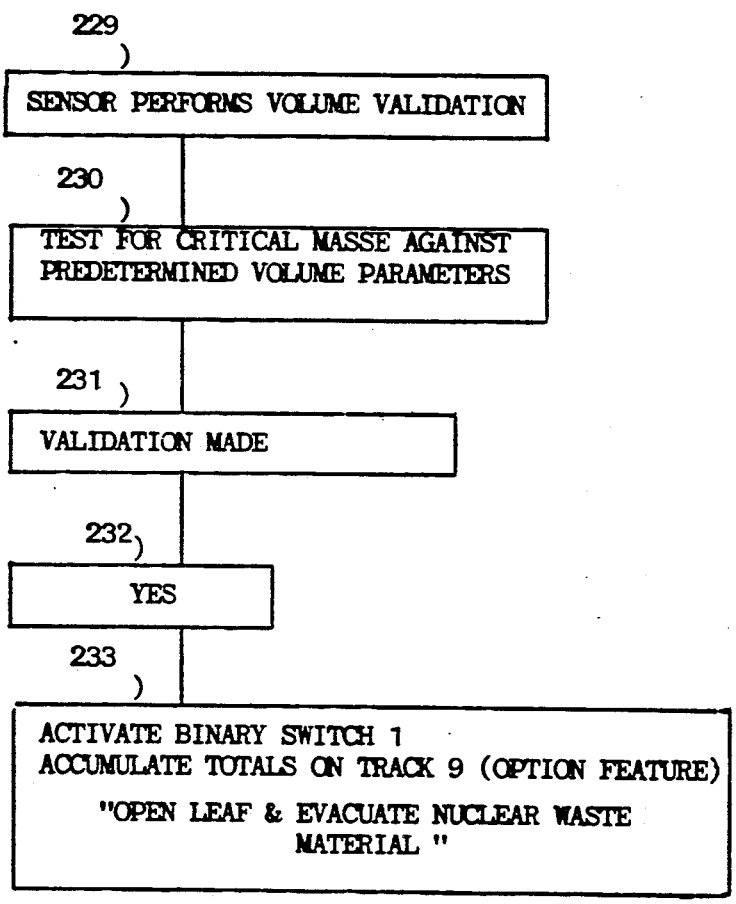
FIG. 38 is a block diagram depicting a nuclear waste measurement binary test on track 9 of the data disc drum.

| Binary switch validation | |
|---|---|
| "0" switch | no masse |
| "1" switch | critical masse which will require evacuation |
| Illustation of the mechanism is on FIG. 38. | |

In FIG. 24, a 170 represents the nuclear power plant main power generating facility containing an operating console and central processors. A 171 represents the operating console. A 172 represents the central processor. A 173 represents a sensor which detects the critical masse and at a predefined level triggers the opening of the leaf to evacuate the waste. A 174 is a leaf which opens to evacuate nuclear waste material. A 175 is a leaf which closes the facility once the evacuation of nuclear waste is complete. A 176 accumulates the critical masse totals on track 9 of the data disc drum. A 177 is the evacuation facility platform.

Figure 25:
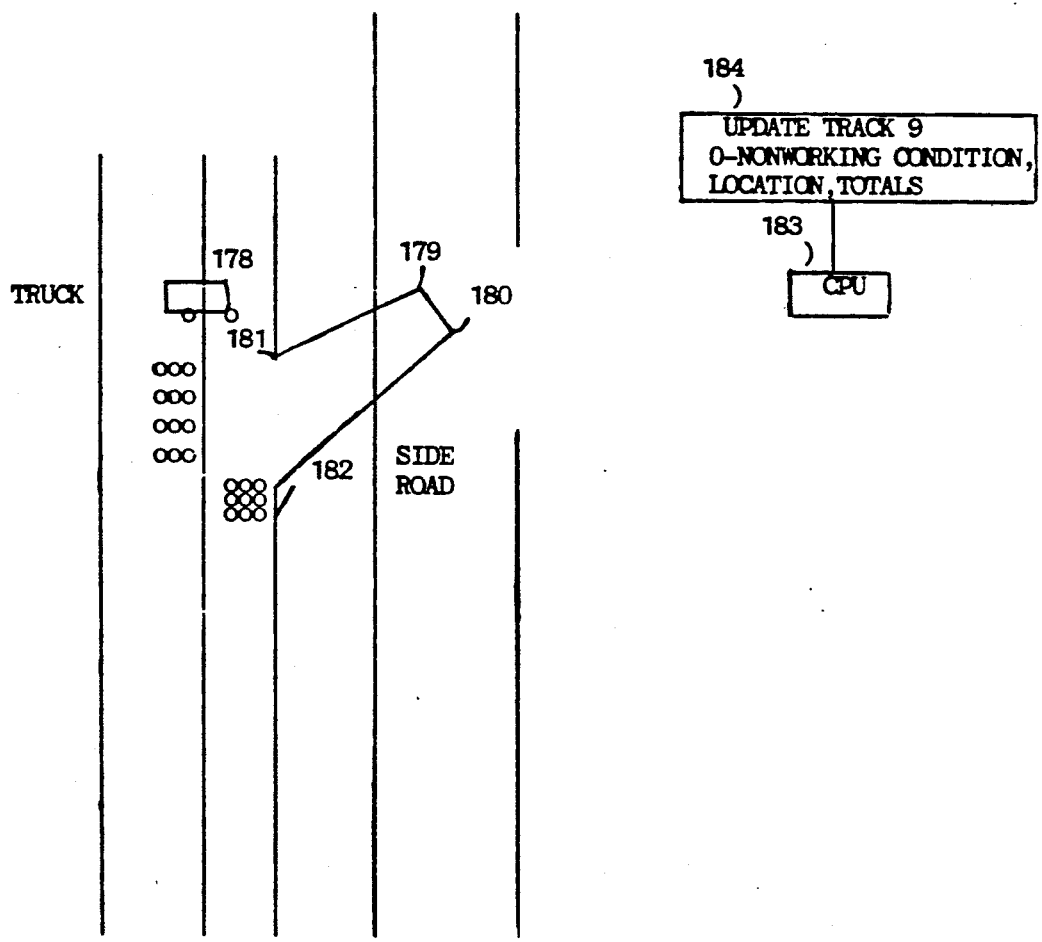
FIG. 25 is a block diagram depicting the report of traffic stoppages to the central processing unit and update of track 9 on the data disc drum.

FIG. 25 is a block diagram depicting a municipal traffic monitoring system capability. The system measures traffic stoppages in a predefined geographical area. In FIG. 25, the input variables are explained below.

| Input variables are explained on track 9 of the data disc drum. | |
|---|---|
| "0" non-working condition | traffic stoppage |
| Location | physical location of the traffic stoppage |
| Totals | system-wide bottleneck totals |
| An Illustration is shown in FIG. 39 | |

In FIG. 25, a 178 is the roadway.

A 179 and 180 represent imprint key mechanisms to disengage the inner pole so it can be lifted and the gate will open. A 181 and 182 represent individual sensors which turn on, indicating a non-working condition, once the gates are swung open and the traffic is redirected to the side road. The triggering of the sensor will cause the central processor 183 to record a non-working condition on track 9 of the data disc drum. A 184 accumulates statistical data on all non-working conditions.

Figure 26:
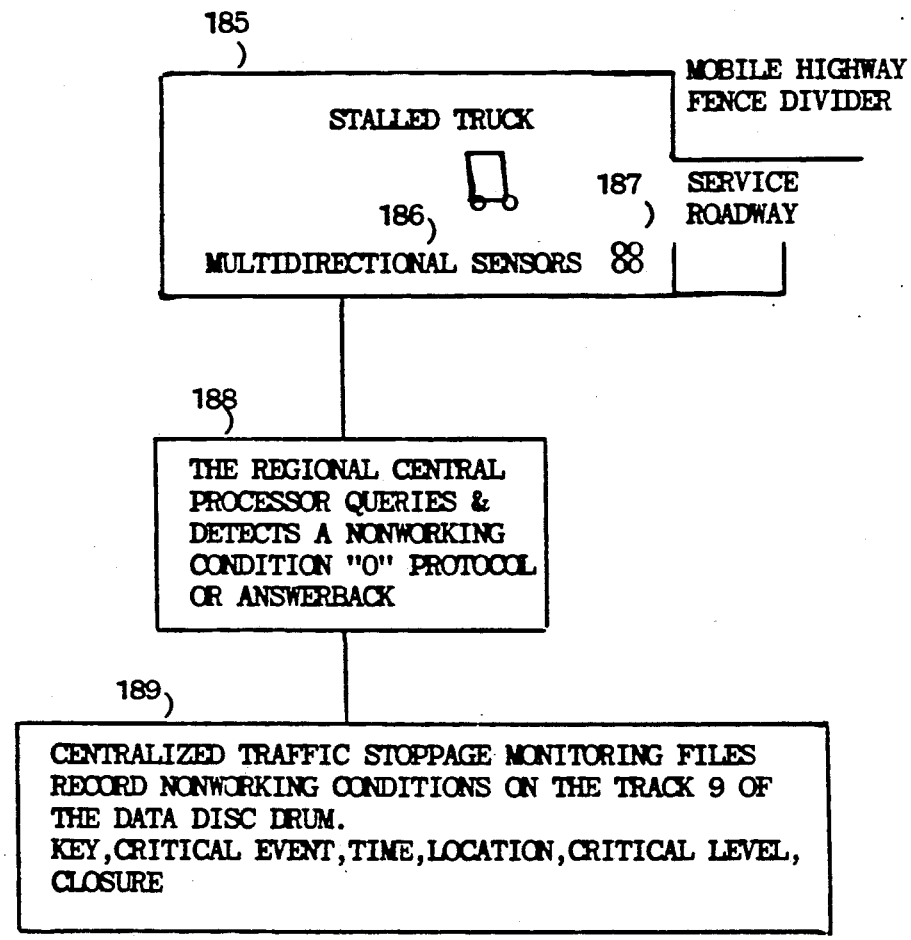
FIG. 26 is a block diagram depicting data gathering of nonworking conditions on track 9 of the data disc drum.

FIG. 26 is a block diagram which depicts the roadway sensors and the reporting interface with the centralized traffic stoppage monitoring files. In FIG. 26, the input variables are explained below.

| Input variables are on track 9 of the data disc drum. | |
|---|---|
| Critical event | a traffic stoppage on a major roadway is a critical event |
| Time | the time of the critical event is recorded by the system |
| Location | the location of the traffic stoppage is recorded by the system |
| Critical level | the critical level indicates the severity of the traffic stoppage |
| Closure | solution of the traffic stoppage |

In FIG. 26, a 185 represents the stalled vehicle or road impediment. A 186 and 187 represent the sensors which detect the non-operating conditions. A 188 represents the regional central processor query of the non-working condition and dialup to the central processor to record the event. A 189 represents the central traffic monitoring event status files.

FIG. 27 to FIG. 39 contain samples of the output report menus. FIG. 40 summarizes all output reports on the system and cross-references them to the applicable track number on the data disc drum. In addition, each report name contains a report description.

What is claimed is:

1. An unmanned compliance monitoring device which is a stationary structure for gathering epicenter information in the encasement comprising:
   a. a reinforced cylindrical encasement with anchors piledriven into the ground,
   b. a portable phone with means for communicating tremors, seismic disturbances, epicenter information and nonoperating conditions of the operating system, ground sensor, storage device and photovoltaic solar module to a satellite,
   c. a master internal clock and duplicate standby clock with means for measuring the time of earth tremor events,
   d. a master central processor and standby central processor with means for calculating the distance of the epicenter and monitoring the condition of ground sensors, storage devices, photovoltaic solar energy modules and timing outages,
   e. underground sensors with means for motion detection and reporting seismic activity to the central processor of the unmanned compliance monitoring device for accumulating observed statistics and reporting them to a satellite,
   f. above ground sensors with means for detecting motion above ground and reporting seismic activity to the central processor of the unmanned compliance monitoring device for accumulating observed statistics and reporting them to a satellite through the portable phone automatic dialup of a satellite,
   g. a photovoltaic solar energy panel with means to convert solar energy to electricity for the unmanned compliance monitoring device and an alternate power line in the encasement.

2. A system with means for processing a plurality of files for measuring earthquake tremors and problem management of the device; wherein, the said system includes:
   (a) data files for sequentially storing various classifications of information on the data storage disks including the epicenter location derived by measuring the distance from at least 3 separated unmanned monitoring compliance devices and the magnitude of seismic disturbances expressed in the logarithmic scale,
   (b) data processing means for constructing profiles of the calculation of the earthquake epicenter and measurement of the seismic disturbance and monitoring and tracking breakdowns of the ground devices, storage devices and photovoltaic solar energy modules, (c) system architecture includes means for data entry from motion sensing devices, means for data collection of seismic information and processing through the central processor to the portable phone to the satellite, means for placing segmental data messages into temporary storage until collection of each message segment which combinds to yield a completed message consisting of the epicenter data determined when 3 independent measurement devices forward seismic data for a single epicenter calculation onto the data storage disks.

3. A system as set forth in claim 2 further comprising a motion sensor for detecting seismic activity and reporting the seismic activity through the portable phone to the satellite for making the calculation of the epicenter; a system for logically calculating the distance of the epicenter from the unmanned compliance monitoring device, a system for detecting the status of ground sensors, storage devices, the photovoltaic solar energy module and transmitting data to the satellite by a portable phone; a system for detecting primary and secondary waves through the underground sensors, accumulating the data through the data collection computer and reporting the data to the satellite through the portable phone by combining three independent seismic measurements and translating the result into a logarithymic measurement of the earth tremor by Richter scale.

4. A system as set forth in claim 2 further comprising underground sensors, a central processor, a portable phone, a data storage drum and a satellite with means for the underground sensors to receive seismic data and the central processor to process the seismic data consisting of each individual message segment sent to a satellite by the portable phone with the satellite combining three message segments from three independent observations to yield a single epicenter piece of data with means for the satellite to query the central processor of the encased unmanned compliance monitoring device, ground sensor, storage device and photovoltaic solar module to determine breakdown occurrences for aggregation onto the data storage drum.

* * * * *

UNITED STATES PATENT AND TRADEMARK OFFICE
CERTIFICATE OF CORRECTION

PATENT NO. : 5,075,857
DATED : December 24, 1991
INVENTOR(S) : Joseph S. Maresca It is certified that error appears in the above-identified patent and that said Letters Patent is hereby corrected as shown below:

On Col. 1 line 13, GPO should have placed a comma " , " after the words economic subsystems.

On Col. 1 line 39, GPO should have printed "specific tracks of the data storage" instead of "specific tracks or the data storage On Col. 3 line 24, GPO should have printed "relay pain signals"; instead of "replay pain signals".

On Col. 4 line 59, GPO should have printed "application" singular; instead of the plural "applications" .

On Col. 6 line 28, GPO should have printed "update" instead of printing updata.

On Col. 11 line 2, GPO should have printed "cylindrical" instead of printing cylinderical in error.

On Col. 12 line 4, GPO printed individual event instead of printing "individual events" in the plural form.

GPO printed prior art patent 3,387,277 68 by Singer. This art is not listed on the examiner's 2/91 listing of prior art cited.

Signed and Sealed this

Fifteenth Day of June, 1993

Attest:

MICHAEL K. KIRK

*Attesting Officer*    Acting Commissioner of Patents and Trademarks